US011960233B2

(12) United States Patent
Ninomiya

(10) Patent No.: US 11,960,233 B2
(45) Date of Patent: Apr. 16, 2024

(54) IMAGE FORMING APPARATUS HAVING RESIDUAL TONER COLLECTING CONTAINERS

(71) Applicant: CANON KABUSHIKI KAISHA, Tokyo (JP)

(72) Inventor: Takashi Ninomiya, Chiba (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/848,447

(22) Filed: Jun. 24, 2022

(65) Prior Publication Data

US 2022/0326652 A1 Oct. 13, 2022

Related U.S. Application Data

(62) Division of application No. 17/227,427, filed on Apr. 12, 2021, now Pat. No. 11,397,402.

(30) Foreign Application Priority Data

Apr. 15, 2020 (JP) ................................ 2020-073185

(51) Int. Cl.
*G03G 21/00* (2006.01)
*G03G 15/16* (2006.01)
(Continued)

(52) U.S. Cl.
CPC ........... *G03G 21/12* (2013.01); *G03G 15/161* (2013.01); *G03G 21/105* (2013.01);
(Continued)

(58) Field of Classification Search
CPC ...... G03G 21/10; G03G 21/105; G03G 21/12; G03G 21/169; G03G 15/0189;
(Continued)

(56) References Cited

U.S. PATENT DOCUMENTS

| | | | |
|---|---|---|---|
| 7,515,848 | B2 | 4/2009 | Kitozaki |
| 7,965,972 | B2 | 6/2011 | Ichikawa et al. |

(Continued)

FOREIGN PATENT DOCUMENTS

| | | | |
|---|---|---|---|
| CN | 1928733 | A | 3/2007 |
| JP | H08-190245 | A | 7/1996 |

(Continued)

OTHER PUBLICATIONS

Japanese Office Action dated Jan. 30, 2023, in related Japanese Patent Application No. 2020-073185.

(Continued)

*Primary Examiner* — Robert B Beatty
(74) *Attorney, Agent, or Firm* — VENABLE LLP

(57) ABSTRACT

An image forming apparatus includes a first collecting container provided detachably and configured to collect residual toner discharged from an image forming portion, a second collecting container provided detachably and configured to collect the residual toner discharged from the image forming portion, and a feeding device to feed the residual toner, discharged from the image forming portion, toward the first collecting container and the second collecting container selectively. The first collecting container and the second collecting container are provided below an intermediary transfer belt and disposed side by side in a widthwise direction perpendicular to a rotational axis direction of an image bearing member, and at least a part of the first collecting container overlaps with the intermediary transfer belt as viewed in the vertical direction, and at least a part of the second collecting container overlaps with the intermediary transfer belt as viewed in the vertical direction.

18 Claims, 8 Drawing Sheets

(51) Int. Cl.
*G03G 21/10* (2006.01)
*G03G 21/12* (2006.01)

(52) U.S. Cl.
CPC . *G03G 15/1615* (2013.01); *G03G 2215/1661* (2013.01); *G03G 2221/1624* (2013.01)

(58) Field of Classification Search
CPC ......... G03G 15/161; G03G 2215/0125; G03G 2215/1661; G03G 2221/0063; G03G 2221/1624
USPC ................ 399/101, 123, 302, 308, 358, 360
See application file for complete search history.

(56) References Cited

U.S. PATENT DOCUMENTS

| | | | |
|---|---|---|---|
| 9,158,267 B2 | 10/2015 | Kuwabara et al. | |
| 11,126,133 B1 | 9/2021 | Saiki et al. | |
| 2010/0080638 A1 | 4/2010 | Ichikawa et al. | |
| 2011/0142490 A1 | 6/2011 | Kikuchi et al. | |
| 2011/0236055 A1 | 9/2011 | Mori et al. | |
| 2011/0236056 A1 | 9/2011 | Mori et al. | |
| 2013/0071165 A1* | 3/2013 | Kitamura ............. | G03G 21/105 399/358 |
| 2014/0161474 A1 | 6/2014 | Oda | |
| 2021/0034007 A1 | 2/2021 | Tamaki et al. | |
| 2021/0325818 A1 | 10/2021 | Tajima et al. | |
| 2021/0325819 A1 | 10/2021 | Mine et al. | |

FOREIGN PATENT DOCUMENTS

| | | |
|---|---|---|
| JP | 2002-014503 A | 1/2002 |
| JP | 2007-114598 A | 5/2007 |
| JP | 2008-070405 A | 3/2008 |
| JP | 2008-203751 A | 9/2008 |
| JP | 2010-117675 A | 5/2010 |
| JP | 2013-171211 A | 9/2013 |
| JP | 2014-115521 A | 6/2014 |
| JP | 2014-202930 A | 10/2014 |
| JP | 2015-059946 A | 3/2015 |
| JP | 2016-099449 A | 5/2016 |
| JP | 2016-194589 A | 11/2016 |
| JP | 2019-139167 A | 8/2019 |

OTHER PUBLICATIONS

Chinese Office Action dated Feb. 4, 2024, in related Chinese Patent Application No. 202110392107.5.

* cited by examiner

IMAGE FORMING APPARATUS HAVING RESIDUAL TONER COLLECTING CONTAINERS

This application is a continuation of application Ser. No. 17/227,427, filed Apr. 12, 2021.

FIELD OF THE INVENTION AND RELATED ART

The present invention relates to an image forming apparatus, such as a copying machine, a printer, a facsimile machine or a multi-function machine having a plurality of functions of these machines, of an electrophotographic type or an electrostatic recording type.

Conventionally, for example, in the image forming apparatus of the electrophotographic type, such as the copying machine, by an electrophotographic image forming process, a toner image formed on a photosensitive member as an image bearing member with a developer containing toner is transferred onto a transfer-receiving member such as a recording material. Toner (transfer residual toner) remaining on the photosensitive member during transfer of a toner image from the photosensitive member onto the transfer-receiving member is removed from the surface of the photosensitive member by a cleaning means and is fed as a collected developer to a developer collecting container by a developer collecting device, so that the collected developer is accumulated inside the developer collecting container. Then, the developer collecting container is exchanged to a blank developer collecting container in the case where the inside of the developer collecting container becomes full with the collected developer or in the like case. Conventionally, in general, when the developer collecting container is exchanged, there is a need to stop an image forming operation of the image forming apparatus in order to stop feeding of the collected developer by the developer collecting device. For that reason, for example, in a business operation in which continuous printing in a large volume is desired, there is a problem such that productivity lowers due to the exchange of the developer collecting container.

In order to solve this problem, a constitution in which a plurality of developer collecting containers is provided so as to be mountable in and dismountable from an apparatus main assembly of the image forming apparatus has been known.

Japanese Laid-Open Patent Application (JP-A) 2008-203751 discloses a constitution in which residual (waste) toner is fed to a lowermost toner collecting container of a plurality of toner collecting containers vertically stacked and is taken out in the case where this collecting container becomes full and then in which the toner collecting container right above the lowermost toner collecting container is moved to a lowermost position. In the constitution disclosed in JP-A 2008-203751, the toner collecting containers are provided on a right side, a left side or a rear side of a sheet cassette provided at a lower portion of the image forming apparatus.

Further, JP-A 2014-115521 discloses a constitution in which a residual developer is fed to one of a plurality of collecting containers and the plurality of collecting containers are moved together in the case where the collecting container to which the residual developer is fed becomes near full and then in which another one of the collecting containers is used as a buffer container for temporarily accommodating the residual developer. In the constitution disclosed in JP-A 2014-115521, the collecting containers are mounted in a container mounting portion formed at a lower portion of the image forming apparatus on a rear side of a casing of the image forming apparatus.

However, conventionally, in the constitution in which the plurality of (developer) collecting containers are provided so as to be mountable in and dismountable from the apparatus main assembly, the image forming apparatus is liable to upsize. Further, a feeding passage of the collected developer from an image forming portion to each of the collecting containers is liable to become complicated, and therefore, a risk of sticking and clogging of the collected developer in the feeding passage increases.

Incidentally, in the above, the collected developer was described as the transfer residual toner removed from the photosensitive member, but the collected developer generating in the image forming apparatus is not limited thereto. For example, the collected developer may also be transfer residual toner removed from an intermediary transfer member which feeds a toner image, primary-transferred from the photosensitive member as a first image bearing member, to a recording material for secondary transfer and which is used as a secondary image bearing member. Further, for example, the collected developer may also be a developer (which may contain toner and a carrier) or the like discharged from a developing provided for developing an electrostatic image formed on the image bearing member.

SUMMARY OF THE INVENTION

A principal object of the present invention is to provide an image forming apparatus capable of suppressing upsizing of the image forming apparatus and of simplifying a feeding passage of a collected developer in a constitution in which a plurality of developer collecting containers are provided so as to be mountable in and dismountable from the image forming apparatus.

According to an aspect of the present invention, there is provided an image forming apparatus comprising: an image forming portion including an image bearing member for bearing a toner image and configured to form the toner image; an intermediary transfer belt provided at a position where the intermediary transfer belt overlaps with the image forming portion as viewed in a vertical direction and onto which the toner image is transferred from the image bearing member; a first mounting portion where a first collecting container for collecting residual toner discharged from the image forming portion is mounted so as to be mountable in and dismountable from the first mounting portion; a second mounting portion where a second collecting container for collecting the residual toner discharged from the image forming portion is mounted so as to be mountable in and dismountable from the second mounting portion; and a feeding device including a first discharging portion where the residual toner discharged from the image forming portion is discharged toward the first collecting container and a second discharging portion where the residual toner discharged from the image forming portion is discharged toward the second collecting container and configured to feed the residual toner, discharged from the image forming portion, toward the first collecting container and the second collecting container, wherein the first mounting portion and the second mounting portion are provided below the intermediary transfer belt and are disposed side by side in a widthwise direction perpendicular to a rotational axis direction of the image bearing member, and wherein as viewed in the vertical direction, each of the first mounting portion and the second mounting portion is provided at a position where at least a part of the first and second mounting portion overlaps with the intermediary transfer belt.

According to another aspect of the present invention, there is provided an image forming apparatus comprising: an image forming portion including an image bearing member for bearing a toner image and configured to form the toner image; an intermediary transfer belt provided at a position where the intermediary transfer belt overlaps with the image forming portion as viewed in a widthwise direction perpendicular to a rotational axis direction of the image bearing member and onto which the toner image is transferred from the image bearing member; a first mounting portion where a first collecting container for collecting residual toner discharged from the image forming portion is mounted so as to be mountable in and dismountable from the first mounting portion; a second mounting portion where a second collecting container for collecting the residual toner discharged from the image forming portion is mounted so as to be mountable in and dismountable from the second mounting portion; and a feeding device including a first discharging portion where the residual toner discharged from the image forming portion is discharged toward the first collecting container and a second discharging portion where the residual toner discharged from the image forming portion is discharged toward the second collecting container and configured to feed the residual toner, discharged from the image forming portion, toward the first collecting container and the second collecting container, wherein the first mounting portion and the second mounting portion are provided below the intermediary transfer belt and are disposed side by side in the widthwise direction, and wherein as viewed in a vertical direction, each of the first mounting portion and the second mounting portion is provided at a position where at least a part of the first and second mounting portion overlaps with the intermediary transfer belt or the image forming portion.

Further features of the present invention will become apparent from the following description of exemplary embodiments with reference to the attached drawings.

Figure 3:
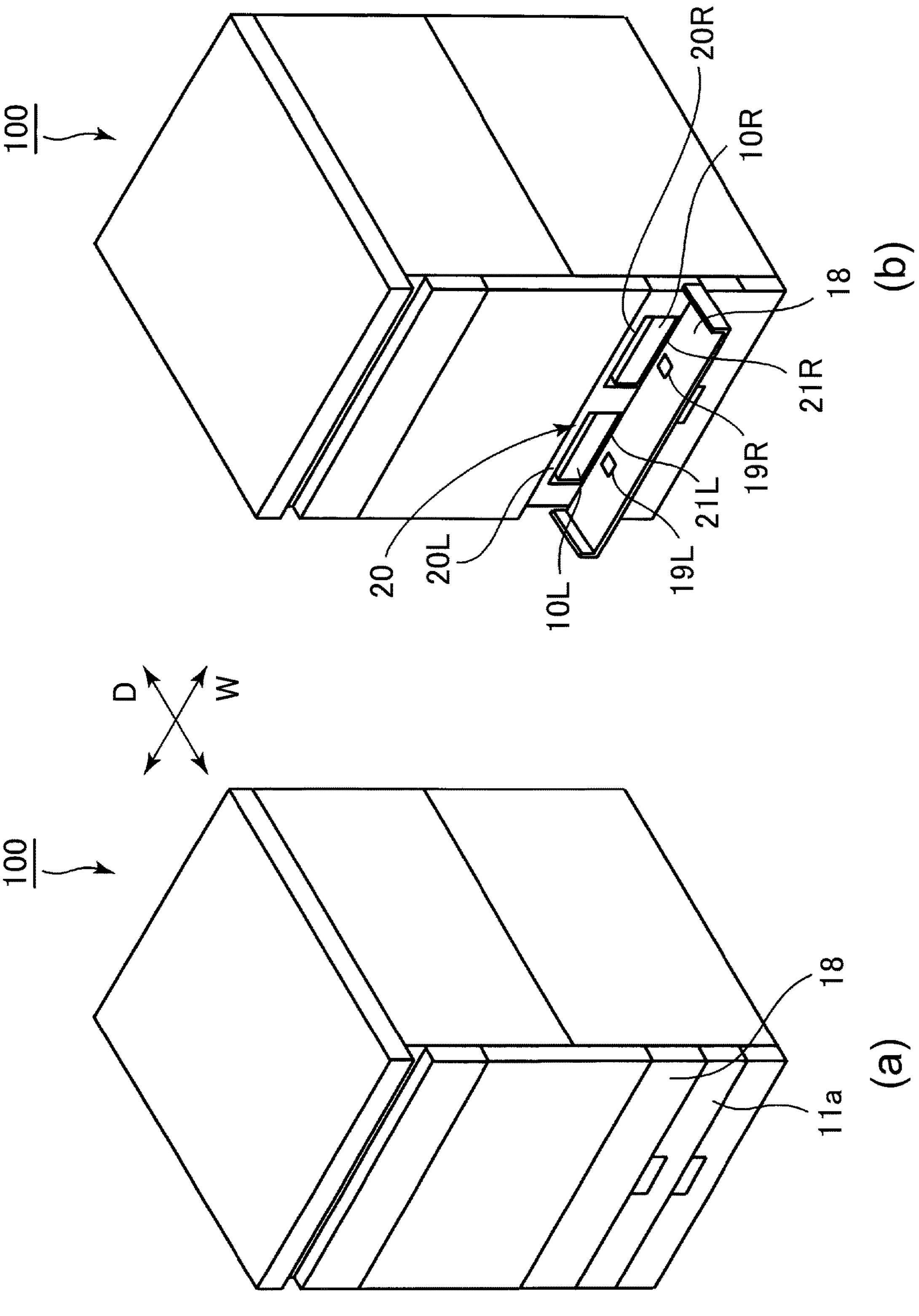

Parts (a) and (b) of FIG. 3 are schematic perspective views of the image forming apparatus for illustrating a mounting mode of a developer collecting container.

Figure 4:
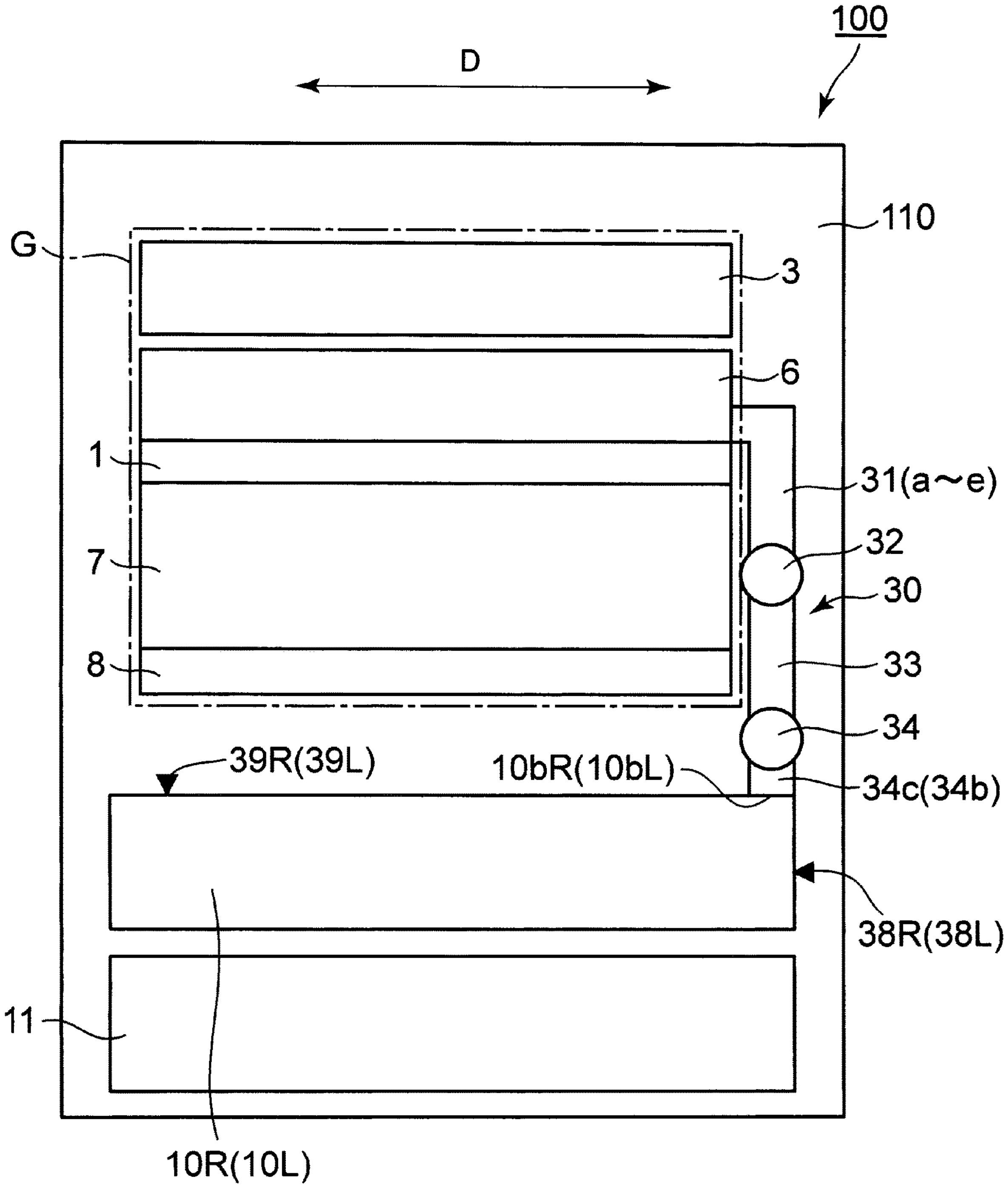

FIG. 4 is a schematic view of an inside of the image forming apparatus.

Figure 5:
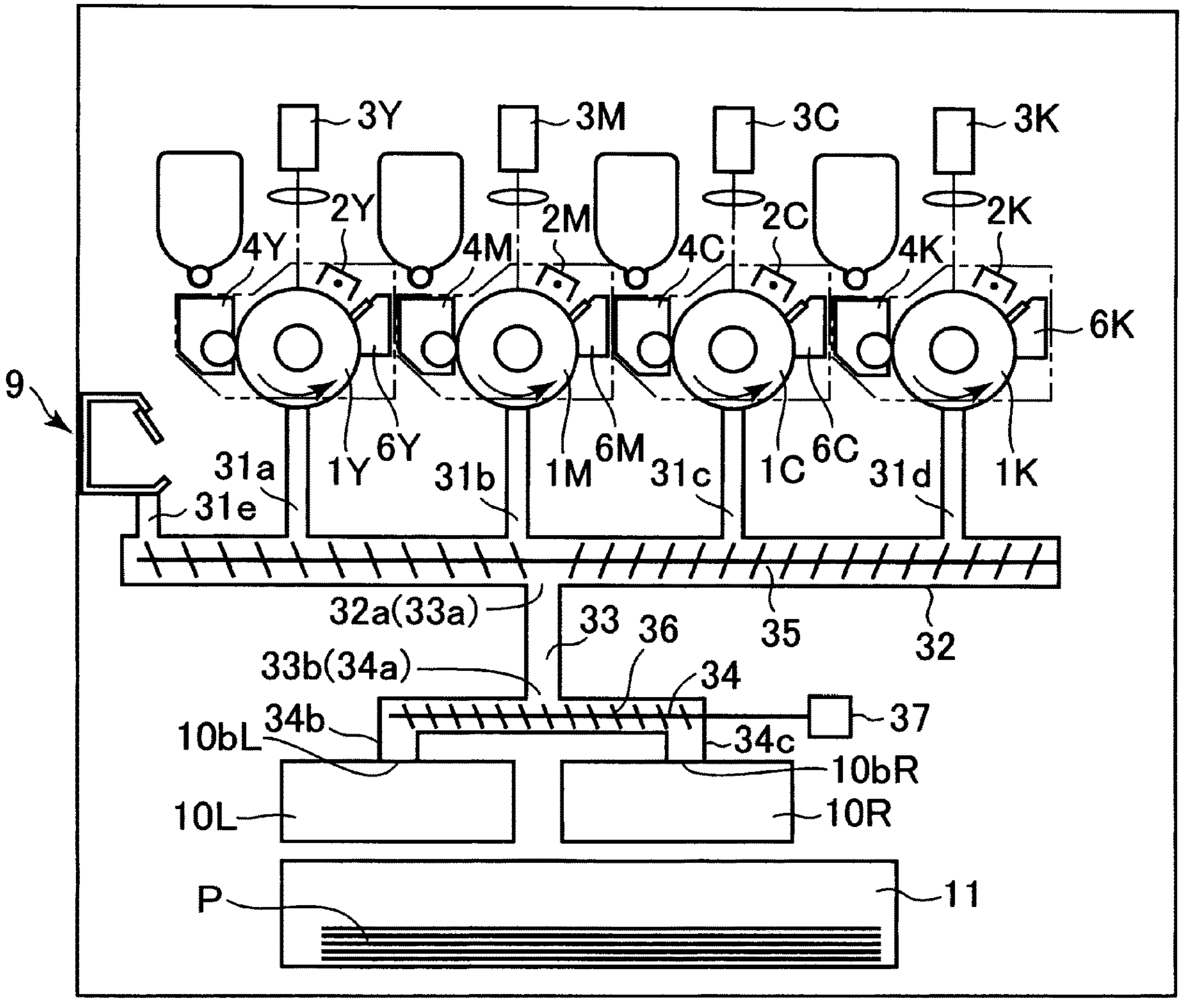

FIG. 5 is a schematic sectional view showing a feeding passage of the collected developer.

Figure 6:
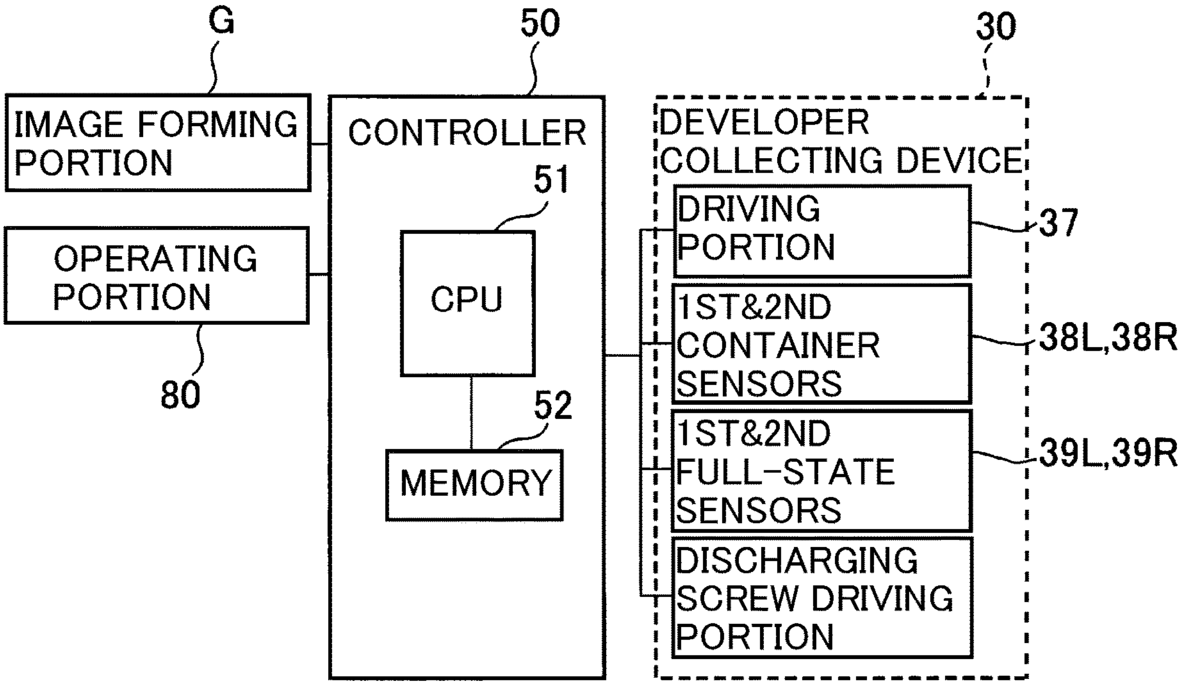

FIG. 6 is a block diagram showing a control mode of a developer collecting device.

Figure 7:
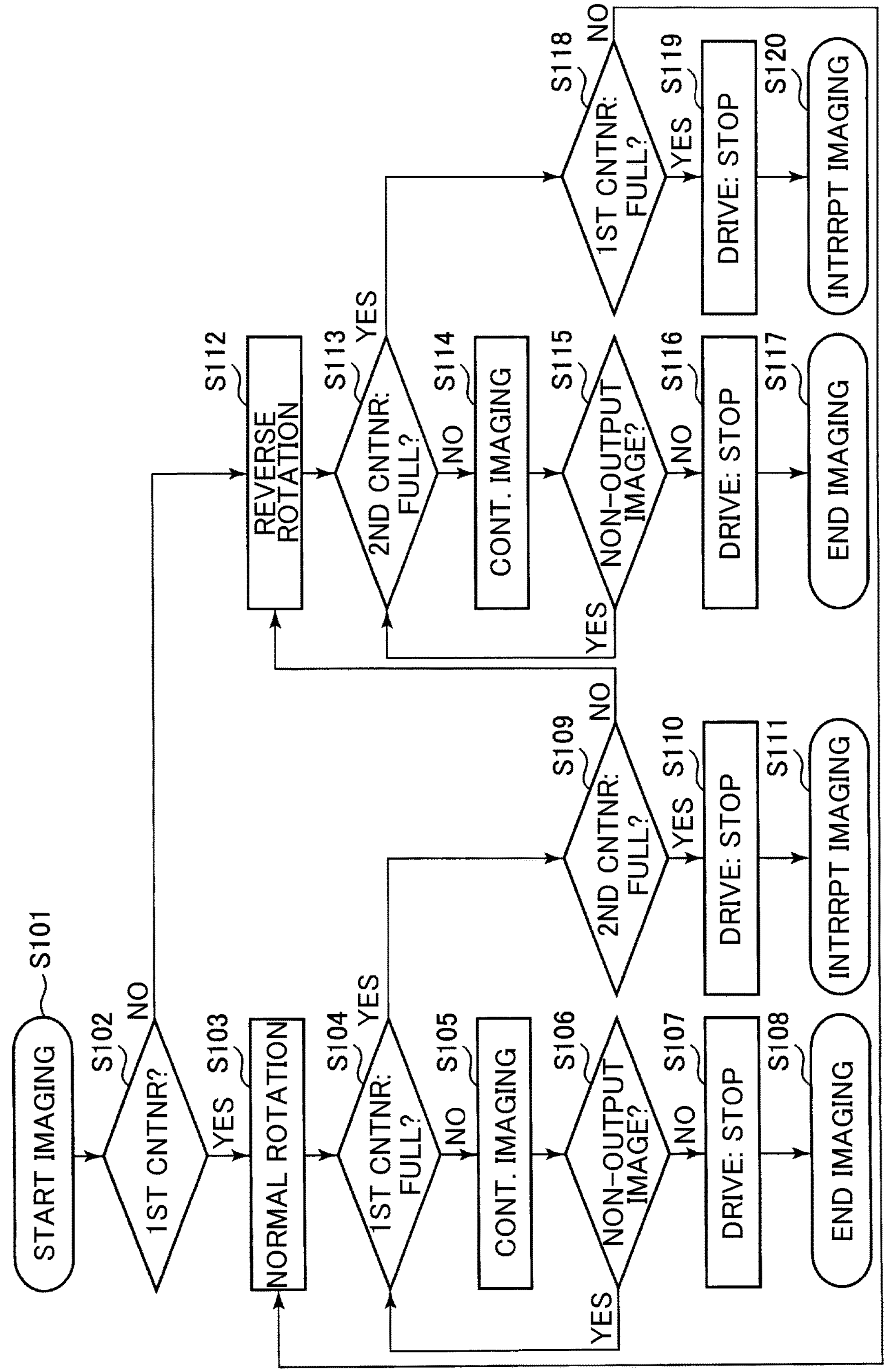

FIG. 7 is a flowchart showing an outline of a procedure of a developer collecting operation.

Figure 8:
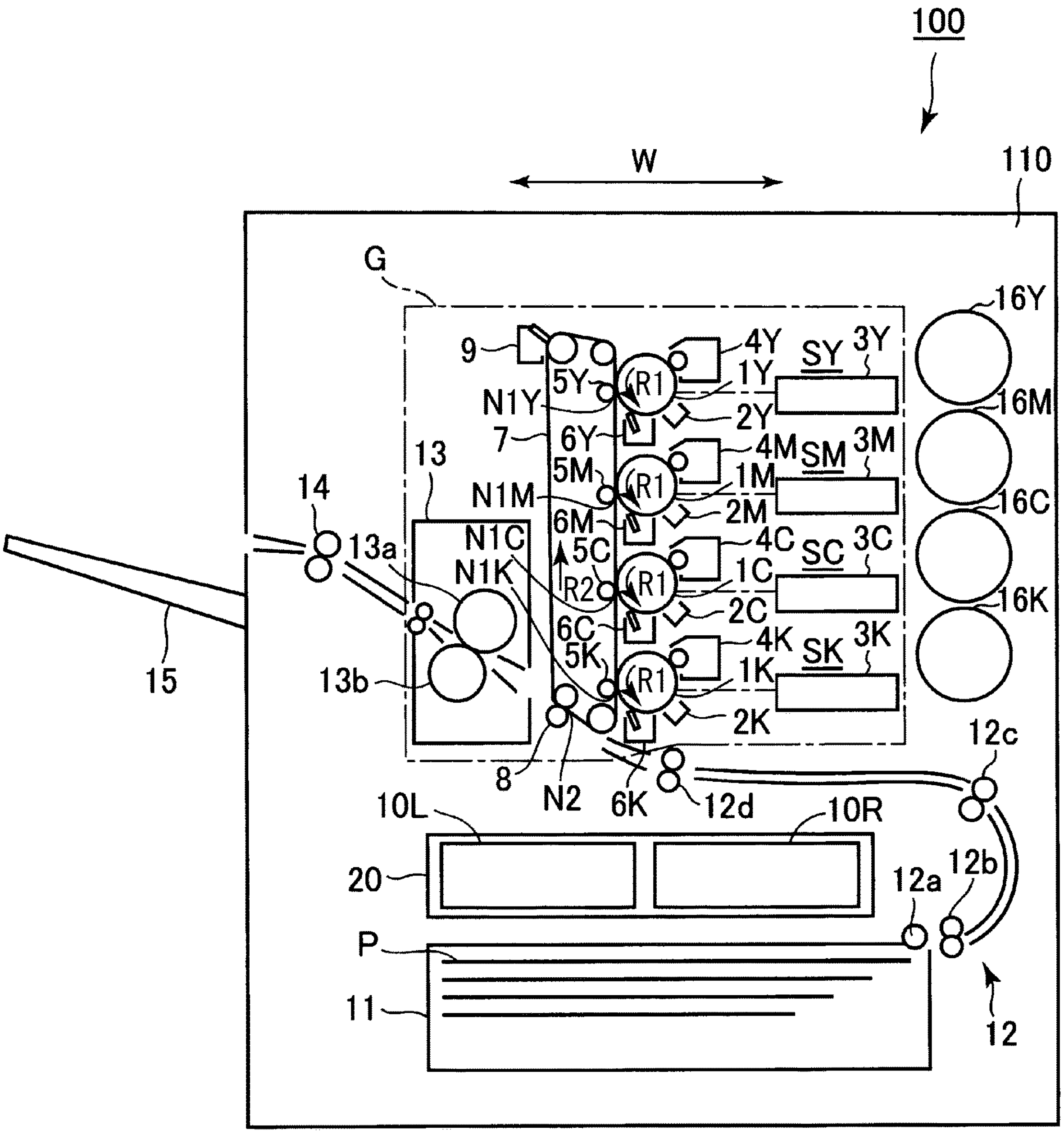

FIG. 8 is a schematic sectional view of an image forming apparatus in another embodiment.

DESCRIPTION OF THE EMBODIMENTS

An image forming apparatus according to the present invention will be described with reference to the drawings.

Embodiment 1

1. General Constitution and Operation of Image Forming Apparatus

Figure 1:
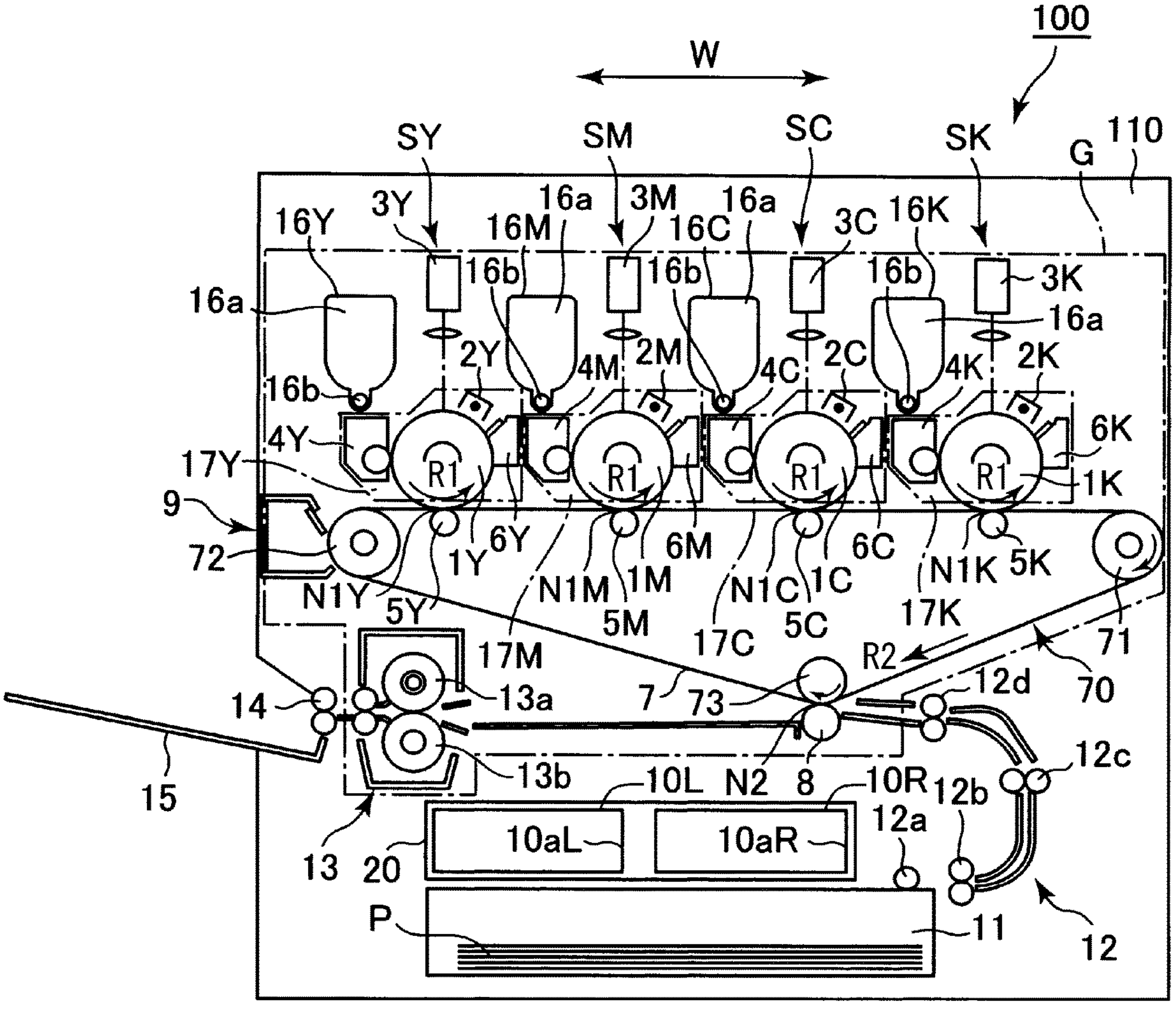
FIG. 1 is a schematic sectional view of an image forming apparatus.

FIG. 1 is a schematic sectional view (cross-section substantially perpendicular to a rotational axis direction of a photosensitive drum 1 described later) of an image forming apparatus 100 in this embodiment according to the present invention. The image forming apparatus 100 in this embodiment is a tandem-type printer capable of forming a full-color image by employing an electrophotographic type and an intermediary transfer type.

Incidentally, as regards the image forming apparatus 100 and constituent elements thereof, a front side on the drawing sheet of FIG. 1 is referred to as a "front" side, and a rear side on the drawing sheet of FIG. 1 is referred to as a "rear" side. An operator such as a user or a service person performs, in general, an operation of the image forming apparatus 100 from the front side of the image forming apparatus 100. A front-rear direction of the image forming apparatus 100 is substantially parallel to a rotational axis direction of the photosensitive drum 1 described later. Further, as regards the image forming apparatus 100 and the constituent elements thereof, a left side and a right side as viewed from the front side are referred to as a left side and a right side, respectively. Further, an up-down direction refers to an up-down direction with respect to the direction of gravitation, but does not mean only right above and right below, and also includes an upper side and a lower side of a horizontal plane passing through an associated element or position.

The image forming apparatus 100 includes as a plurality of image forming means, first to fourth stations SY, SM, SC and SK for forming toner images of yellow (Y), magenta (M), cyan (C) and black (K), respectively. As regards elements having the same or corresponding functions and constitutions in the respective stations SY, SM, SC and SK, suffixes Y, M, C and K representing the elements for associated colors are omitted, and the elements will be collectively described in some instances. In this embodiment, the station S is constituted by including the photosensitive drum 1, a charging device 2, an exposure device 3, a developing device 4, a primary transfer roller 5, a drum cleaning device 6, and the like. In this embodiment, the plurality (four in this embodiment) of stations SY, SM, SC and SK are provided and disposed side by side along a direction crossing the direction of gravitation, particularly along a substantially horizontal direction in this embodiment.

The photosensitive drum 1 which is a rotatable drum-shaped photosensitive member (electrophotographic photosensitive member) as a first image bearing member is rotationally driven in an indicated arrow R1 direction in FIG. 1. In this embodiment, the four photosensitive drums 1 are disposed side by side along the substantially horizontal direction. A surface of the rotating photosensitive drum 1 is electrically charged uniformly to a predetermined polarity (negative in this embodiment) by the charging device 2 as a charging means.

The surface of the charged photosensitive drum 1 is subjected to scanning exposure to light in accordance with image information by the exposure device (laser scanner) 3 as an exposure means, so that an electrostatic latent image (electrostatic latent image) is formed on the photosensitive drum 1. The electrostatic image formed on the photosensitive drum 1 is developed (visualized) by supplying the toner by the developing device 4 as a developing means, so that the toner image is formed on the photosensitive drum 1. In this embodiment, the toner charged to the same polarity (positive in this embodiment) as the charge polarity of the photosensitive drum 1 is deposited on an exposed portion (image portion) of the photosensitive drum 1 which is lowered in absolute value of the potential by the exposure to light after the photosensitive drum 1 is charged uniformly. In this embodiment, the normal charge polarity of the toner which is the charge polarity of the toner during the development is the negative polarity.

An intermediary transfer belt 7 which is an intermediary transfer member constituted by an endless belt as a second image bearing member is provided opposed to the four photosensitive drums 1. The intermediary transfer belt 7 is extended around a driving roller 71, a tension roller 72 and a secondary transfer opposite roller 73 which are used as a plurality of stretching rollers (supporting rollers), and is stretched with a predetermined tension. The driving roller 71 is rotationally driven and a driving force is transmitted to the intermediary transfer belt 7, so that the intermediary transfer belt 7 is rotated (circulated and moved) in an arrow R2 direction in FIG. 1. On an inner peripheral surface side of the intermediary transfer belt 7, primary transfer rollers 5Y, 5M, 5C, and 5K which are roller-type primary transfer members as primary transfer means are provided correspondingly to the photosensitive drums 1. Each of the primary transfer rollers 5 is pressed (urged) against the intermediary transfer belt 7 toward the associated photosensitive drum 1, so that a primary transfer portion (primary transfer nip) N1 where the photosensitive drum 1 and the intermediary transfer belt 7 contact each other.

The toner image formed on the rotating photosensitive drum 1 is primary-transferred onto the rotating intermediary transfer belt 7 by the action of the primary transfer roller 5. During the primary transfer, to the primary transfer roller 5, a primary transfer voltage which is a DC voltage of an opposite polarity to the normal charge polarity of the toner is applied. For example, during full-color image formation, the respective color toner images of yellow, magenta, cyan and black formed on the respective photosensitive drums 1 are successively transferred superposedly onto the intermediary transfer belt 7.

At a position opposing the secondary transfer opposite roller 73 on an outer peripheral surface side of the intermediary transfer belt 7, a secondary transfer roller 8 which is a roller-type secondary transfer member as a secondary transfer means is provided. The secondary transfer roller 8 is pressed (urged) against the intermediary transfer belt 7 toward the secondary transfer opposite roller 73 and forms a secondary transfer portion (secondary transfer nip) N2 where the intermediary transfer belt 7 and the secondary transfer roller 8 are in contact with each other.

The toner images formed on the intermediary transfer belt 7 as described above are secondary-transferred onto a recording material (recording medium, sheet) P, such as a recording sheet, nipped and fed at the secondary transfer portion N2 by the intermediary transfer belt 7 and the secondary transfer roller 8. During the secondary transfer, to the secondary transfer roller 8, a secondary transfer voltage which is a DC voltage of an opposite polarity to the normal charge polarity of the toner is applied. The recording material P is supplied from a cassette 11 to the secondary transfer portion N2 by a recording material feeding device 12. The recording material feeding device 12 includes a pick-up roller 12*a*, a feeding roller pair 12*b*, a conveying roller pair 12*c*, a registration roller pair 12*d*, and the like. The pick-up roller 12*a* sends recording materials P one by one from the cassette 11. The feeding roller pair 12*b* and the conveying roller pair 12*c* feed and convey the recording material P sent from the cassette 11. The registration roller pair 12*d* not only stops the recording material P conveyed by the feeding roller pair 12*b* and the conveying roller pair 12*c* but also sends the recording material P toward the secondary transfer portion N2 in synchronism with timing of the toner images on the intermediary transfer belt 7.

The recording material P on which the toner images are transferred is conveyed to a fixing device 13. The fixing device 13 includes a fixing roller 13*a* provided with a heat source and a pressing roller 13*b* press-contacted to the fixing roller 13*a*. The fixing device 13 heats and presses the recording material P carrying unfixed toner images by nipping and conveying (feeding) the recording material P between the fixing roller 13*a* and the pressing roller 13*b*, so that the fixing device 13 fixed (melts and sticks) the toner images onto the recording material P. The recording material P on which the toner images are fixed is discharged (outputted) by rollers 14 onto a tray 15 provided outside an apparatus main assembly 110 of the image forming apparatus 100.

Figure 2:
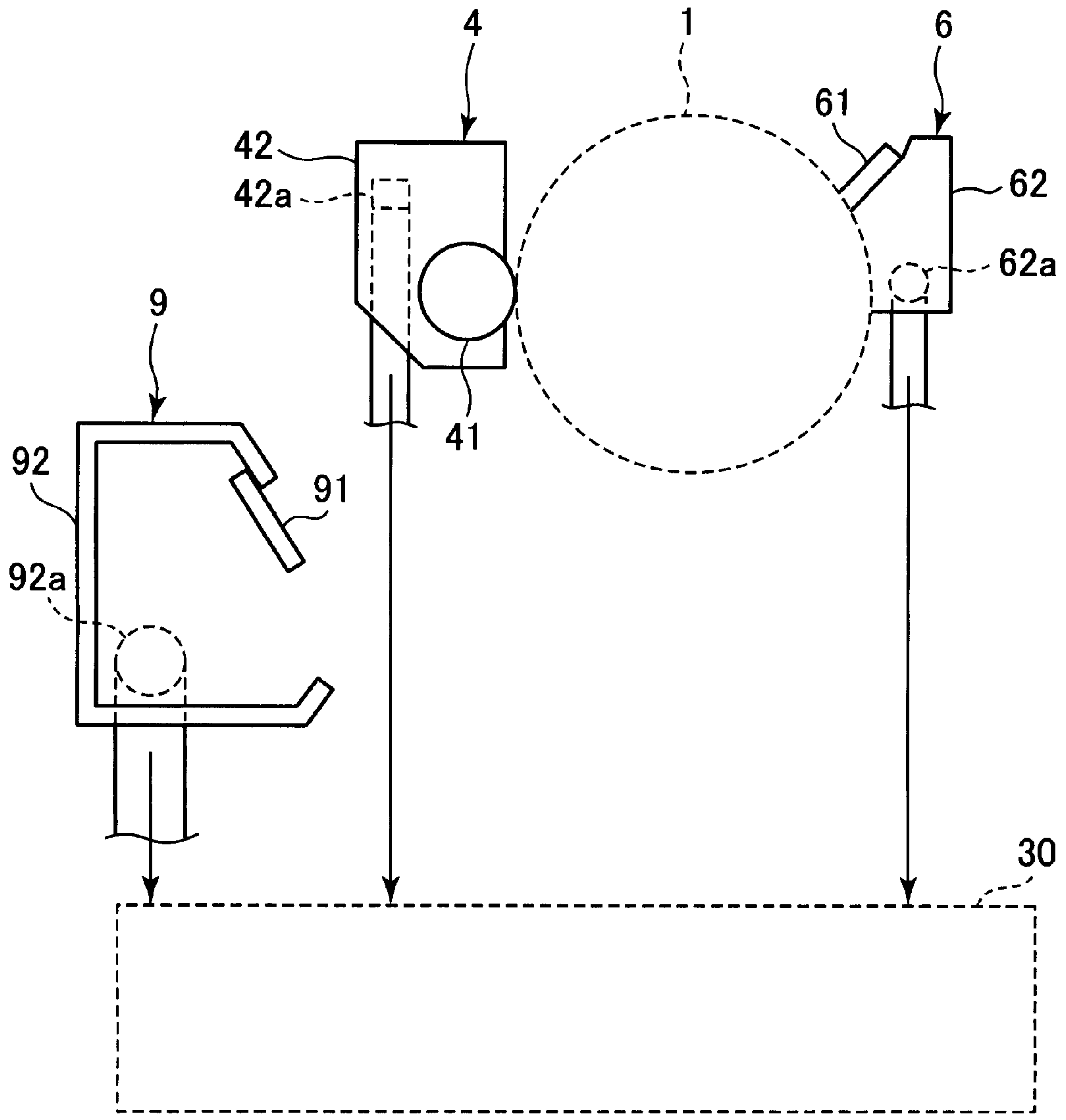
FIG. 2 is a schematic view showing a discharge mode of a collected developer from an image forming portion.

Further, toner (primary transfer residual toner) remaining on the photosensitive drum 1 without being transferred onto the intermediary transfer belt 7 during the primary transfer is removed and collected from the photosensitive drum 1 by the drum cleaning device 6 as a photosensitive member cleaning means. As shown in FIG. 2, the drum cleaning device 6 includes a drum cleaning blade 61 formed with an elastic member as a cleaning member and a drum cleaning container 62 as a toner collecting portion. The drum cleaning device 6 scrapes off the primary transfer residual toner from the surface of the rotating photosensitive drum 1 by the drum cleaning blade 61 disposed in contact with the surface of the photosensitive drum 1 and accommodates the toner inside the drum cleaning container 62.

Further, on the other peripheral surface side of the intermediary transfer belt 7, at a position opposing the tension roller 72, a belt cleaning device 9 as an intermediary transfer belt cleaning means is provided. Toner (secondary transfer residual toner) remaining on the intermediary transfer belt 7 without being transferred on the recording material P during the secondary transfer is removed and collected from the intermediary transfer belt 7 by the belt cleaning device 9. The belt cleaning device 9 includes a belt cleaning blade 91 formed with an elastic member as a cleaning member and a belt cleaning container 92 as a toner collecting portion. The belt cleaning device 9 scrapes off the secondary transfer residual toner from the surface of the rotating intermediary transfer belt 7 by the belt cleaning blade 91 disposed in contact with the surface of the intermediary transfer belt 7 and accommodates the toner inside the belt cleaning container 92.

The primary transfer residual toner accommodated in the drum cleaning container 62 is fed by an unshown feeding means provided inside the drum cleaning container 62. Further, this primary transfer residual toner is discharged through a drum cleaning container discharge opening 62*a* which is an opening and is sent as a collected developer to a developer collecting device 30 described later. Further, the secondary transfer residual toner accommodated in the belt cleaning container 92 is fed by an unshown feeding means provided inside the belt cleaning container 92. Then, this secondary transfer residual toner is discharged through a belt cleaning container discharge opening 92*a* which is an opening and is sent as a collected developer to the developer collecting device 30 described later.

In this embodiment, in each of the stations S, the photosensitive drum 1 and, as process means actable on the photosensitive drum 1, the charging device 2, the developing device 4 and the cleaning device 6 integrally constitute a process cartridge 17. The process cartridge 17 is constituted so as to be mountable in and dismountable from the apparatus main assembly 110 by being pulled out to the front side of the image forming apparatus 100. The process cartridge 17 for the respective colors have the substantially same structure except that colors of the toners accommodated in the developing devices 4 are different from each other.

Further, in this embodiment, the intermediary transfer belt 7, the stretching rollers 71 to 73 of the intermediary transfer belt 7, the respective primary transfer rollers 5 and the belt cleaning device 9 and the like are integrally assembled into a unit and thus constitute an intermediary transfer unit 70. The intermediary transfer unit 70 is constituted so as to be mountable in and dismountable from the apparatus main assembly 110 by being pulled out from the right side of the image forming apparatus 100.

Further, the image forming apparatus 100 includes toner cartridges 16Y, 16M, 16C and 16K accommodating developers (supply developers) to be supplied to the developing devices 4Y, 4M, 4C and 4K. Each of the toner cartridges 16 is constituted so as to be mountable in and dismountable from the apparatus main assembly 110 by being pulled out to the front side of the image forming apparatus 100. The toner cartridges 16 for the respective colors have the substantially same structure except that colors of the toners accommodated therein are different from each other. Each of the toner cartridges 16 includes a supply developer accommodating portion 16*a* for accommodating the supply developer and a supplying screw 16*b* which is a supplying member for supplying the supply developer, inside the supply developer accommodating portion 16*a*, to the developing device 4.

Here, in this embodiment, the developing device 4 uses, as the developer, a two component developer containing toner (non magnetic toner particles) and a carrier (magnetic carrier particles). As shown in FIG. 2, the developing device 4 include a rotatable developing sleeve 41 as a developer carrying member and a developer container 42 for accommodating (containing) the developer. The developing device 4 carries the developer containing the toner and the carrier on the developing sleeve 41 and feeds the developer to a developing position, where the photosensitive drum 1 and the developing sleeve 41 oppose each other, by rotation of the developing sleeve 41. The developing device 4 supplies the toner of the developer at the developing position to the electrostatic image on the photosensitive drum 1, so that the toner image is formed on the photosensitive drum 1. Further, the developer accommodated inside the developer container 42 and the supply developer supplied from the toner cartridge 16 are fed and circulated while being stirred by an unshown stirring and feeding means provided inside the developer container 42. In this embodiment, the supply developer supplied from the toner cartridge 16 to the developing device 4 contains the toner and the carrier. Further, the developer (containing the toner and the carrier) which became excessive by the supply of the supply developer and which exists inside the developer container 42 is discharged through a developer container discharge opening 42*a* which is the opening with circulation and feeding of the developer inside the developer container 42, so that the developer is sent as the collected developer to the developer collecting device 30 described later.

In this embodiment, an image forming portion G which is a mechanism portion G for forming the images on the recording material P by using the developers is constituted by the respective stations S, the intermediary transfer unit 70, the secondary transfer roller 8 and the fixing device 13. Incidentally, FIG. 2 is a schematic view showing a discharge made of the collected developer from the image forming portion G (the drum cleaning devices 6 and the developing devices 4 of the respective stations S and the belt cleaning device 9 of the respective stations S).

2. Developer Collecting Container

In this embodiment, first and second developer collecting containers (first and second collected developer containers) 10L and 10R are provided as a plurality of developer collecting containers so as to be mountable in and dismountable from the apparatus main assembly 110 of the image forming apparatus 100. Further, the collected developer sent from the image forming portion G to the developer collecting device 30 described later is selectively fed and accumulated into either one of the first and second developer collecting containers 10L and 10R. In this embodiment, as described above, the collected developer is discharged in the image forming portion G from the drum cleaning devices 6 and the developing devices 4 of the stations S and from the belt cleaning device 9. Further, in the case where the inside of either one of the first and second developer collecting containers 10L and 10R becomes full with the collected developer, a feeding destination of the collected developer is switched to the other container, and the container full with the collected developer is exchanged with a blank container.

Each of the first and second developer collecting containers 10L and 10R is a box-like container which has a predetermined length with respect to a longitudinal direction and a widthwise direction (short-side direction) and a predetermined thickness (height) with respect to a thickness direction and which has a substantially rectangular cross-section substantially perpendicular to the longitudinal direction. The longitudinal direction is a direction in which the container is disposed inside the apparatus main assembly 110 along the front-rear direction of the image forming apparatus 100. Further, the short-side direction is a direction in which the container is disposed inside the apparatus main assembly 110 along the left-right direction of the image forming apparatus 100. Further, the thickness direction is a direction in which the container is disposed inside the apparatus main assembly 110 along the up-down direction of the image forming apparatus 100. Inside the first and second developer collecting containers 10L and 10R, hollow collected developer accommodating portions 10*a*L and 10*a*R each accommodating the collected developer therein are provided, respectively. In this embodiment, the first and second developer collecting containers 10L and 10R have the substantially same structure, and each container can be mounted inside the apparatus main assembly 110 on not only a left side but also a right side. In this embodiment, inside the apparatus main assembly 110, the first developer collecting container 10L is mounted on the left side, and the second developer collecting container 10R is mounted in the right side.

Parts (a) and (b) of FIG. 3 are schematic perspective views of an outer appearance of the image forming apparatus 100 for illustrating a mounting mode of the first and second developer collecting containers 10L and 10R as viewed from an obliquely front side. Part (a) of FIG. 3 shows a state in which a container exchanging door 18 described later is closed, and part (b) of FIG. 3 shows a state in which the container exchanging door 18 is opened and in which the first and second developer collecting containers 10L and 10R are mountable and dismountable through the container exchanging door 18. On the front side of the image forming apparatus 100, the container exchanging door 18 which not only constitute a part of an outer casing cover of the image forming apparatus 100 but also enables mounting and dismounting of the first and second developer collecting containers 10L and 10R is provided. In this embodiment, the container exchanging door 18 is constituted by a single (common) openable (closable) member through which both the first and second developer collecting containers 10L and 10R are mountable and dismountable. In this embodiment, the container exchanging door 18 has a substantially rectangular shape extending in the left-right direction as viewed from the front side. Further, in this embodiment, the container exchanging door 18 is constituted so as to be rotatable at a lower portion thereof about a rotational axis extending along the left-right direction crossing the up-down direction. Further, the container exchanging door 18 can be opened and closed by rotating an upper side thereof about the rotational axis extending along the left-right direction on a lower side with respect to the up-down direction by an operation of an operator.

As shown in part (a) of FIG. 3, the container exchanging door 18 assumes, in a closed state, a single panel-like outer appearance equal in size, with respect to the left-right direction and the up-down direction, to a front panel 11*a* of the cassette 11 provided downward adjacent to the container exchanging door 18. For that reason, a complicated outer appearance due to provision of two containers (first and second developer collecting containers 10L and 10R) is suppressed. Further, by opening the single container exchanging door 18, the mounting and the dismounting of either one of the first and second developer collecting containers 10L and 10R can be carried out. For that reason, a wasteful operation due to erroneous opening and closing of the door, which can occur in the case where each of the plurality of developer collecting containers is independently provided with a container exchanging door can be suppressed.

As shown in part (b) of FIG. 3, by opening the container exchanging door 18, the operator has access to either one of the first and second developer collecting containers 10L and 10R. The apparatus main assembly 110 is provided with a container mounting portion 20 capable of holding the first and second developer collecting containers 10L and 10R and in which the first and second developer collecting containers 10L and 10R are mounted so as to be mountable and dismountable from the apparatus main assembly 110. In this embodiment, the container mounting portion 20 includes first and second container mounting portions 20L and 20R in which the first and second developer collecting containers 10L and 10R are mounted, respectively. The first and second container mounting portions 20L and 20R are provided with first and second container supporting portions 21L an 21R, respectively, extending in the front-rear direction so as to support a lower side of the first and second developer collecting containers 10L and 10R, respectively. The first and second container mounting portions 20L and 20R have rail-like structures (not shown) in which, for example, the first and second container supporting portions 21L and 21R engage with the first and second developer collecting containers 10L and 10R, respectively. By this, the first and second developer collecting containers 10L and 10R are slid (moved) from the front side toward the rear side and thus can be disposed at predetermined positions inside the apparatus main assembly 110. Further, the first and second developer collecting containers 10L and 10R are slid (moved) from the rear side toward the front side and thus are pulled out from the predetermined positions inside the apparatus main assembly 110, so that the first and second developer collecting containers 10L and 10R can be easily dismounted from the apparatus main assembly 110.

As shown in part (b) of FIG. 3, on an inside surface of the container exchanging door 18, discrimination display portions 19L and 19R are provided so that the operator can visually recognize the container exchanging door 18 in an open state. The discrimination display portions 19L and 19R are disposed at positions corresponding to the first and second developer collecting containers 10L and 10R, respectively, with respect to the left-right direction. In this embodiment, the left side-discrimination display portion 19L is constituted by a seal on which a character such as a "container 1" (or a "left container") is displayed for discriminating the first developer collecting container 10L. Further, in this embodiment, the right side-discrimination display portion 19R constituted by a seal on which a character such as a "container 2" (or a "right container") is displayed for discriminating the second developer collecting container 10R. These discrimination display portions 19L and 19R are used for facilitating discrimination of an associated container when display prompting the operator to exchange either one of the developer collecting containers 10L and 10R is made in an operating portion 80 (FIG. 6) of the image forming apparatus 100 as described later. Incidentally, in this embodiment, the discrimination display portions 19L and 19R were provided on the inside surface of the container exchanging door 18, but the present invention is not limited thereto. The discrimination display portions 19L and 19R may also be provided corresponding to the first and second developer collecting containers 10L and 10R, respectively, for example, on the front surface of the panel adjacent to the first and second container mounting portions 20L and 20R, respectively.

3. Arrangement of Developer Collecting Containers

Next, arrangement of the first and second developer collecting containers 10L and 10R inside the apparatus main assembly 110 in this embodiment will be further described with reference to FIGS. 1 and 4. FIG. 4 is a schematic view showing arrangement of the respective portions in the case where the inside of the image forming apparatus 100 is viewed from the right side of the image forming apparatus 100.

Here, a direction substantially parallel to a rotational axis of, for example, the conveying roller pair 12*c* as a rotatable feeding member for feeding, toward the image forming portion G, the recording material P sent from the cassette 11 as a recording material accommodating portion is a depth direction D (FIG. 4) of the image forming apparatus 100. The rotational axis of the conveying roller pair 12*c* is substantially parallel to a rotational axis of the photosensitive drum 1. That is, the depth direction D of the image forming apparatus 100 corresponds to the above-described front-rear direction of the image forming apparatus 100. Further, a direction substantially parallel to the horizontal direction in across-section substantially perpendicular to the rotational axis of the conveying roller pair 12*c* is a widthwise direction W (FIG. 1) of the image forming apparatus 100. That is, the widthwise direction W of the image forming apparatus 100 corresponds to the above-described left-right direction of the image forming apparatus 100.

At this time, the first and second container mounting portions 20L and 20R are capable of holding the first and second developer collecting containers 10L and 10R side by side in the widthwise direction W so that at a portion below the image forming portion G and above the cassette 11, not only half or more of a length of each of the first and second developer collecting containers 10L and 10R with respect to the depth direction D but also half or more of a length (width) of each of the first and second developer collecting containers 10L and 10R with respect to the widthwise direction W are disposed in a region sandwiched between the image forming portion G and the cassette 11. That is, as the container mounting portion 20 in this embodiment, a structure having the first and second developer collecting containers 10L and 10R disposed only a front side portion or a rear side portion inside the apparatus main assembly 110 is not included. However, the present invention is not limited to the case where the entirety of the first and second developer collecting containers 10L and 10R falls within a region where a range in which a region occupied by the image forming portion G is projected downward in the direction of gravitation and a range in which a region occupied by the cassette 11 is projected upward in the direction of gravitation overlap with each other. Particularly, in this embodiment, the first and second container mounting portions 20L and 20R is capable of holding the first and second developer collecting containers 10L and 10R side by side with respect to the widthwise direction W so that entirety of the length of each of the first and second developer collecting containers 10L and 10R with respect to the widthwise direction W is disposed in the region sandwiched between the image forming portion G and the cassette 11. Further, in this embodiment, the first and second container mounting portions 20L and 20R are constituted so that the first and second developer collecting containers 10L and 10R are moved along the depth direction D and thus are mountable in and dismountable from the first and second container mounting portions 20L and 20R, respectively.

In this embodiment, as described above, the image forming portion G includes the respective stations S, the intermediary transfer unit 70 and the fixing device 13. Further, in this embodiment, the first and second container mounting portions 20L and 20R are capable of holding the first and second developer collecting containers 10L and 10R side by side with respect to the widthwise direction W so that specifically not only half or more of the length of each of the first and second developer collecting containers 10L and 10R with respect to the depth direction D but also half or more of the length of each of the first and second developer collecting containers 10L and 10R with respect to the widthwise direction W are disposed in the region sandwiched between the intermediary transfer belt 7 and the cassette 11. Particularly, in this embodiment, the first and second container mounting portions 20L and 20R are capable of holding the first and second developer collecting containers 10L and 10R side by side with respect to the widthwise direction W so that entirety of the length of each of the first and second developer collecting containers 10L and 10R with respect to the widthwise direction W is disposed in the region sandwiched between the intermediary transfer belt 7 and the cassette 11.

By this, without upsizing the image forming apparatus 100 with respect to the depth direction D and the widthwise direction W, the first and second developer collecting containers 10L and 10R can be disposed side by side along the substantially horizontal direction inside the apparatus main assembly 110. In this embodiment, the first and second developer collecting containers 10L and 10R have the substantially same structure and are disposed side by side inside the apparatus main assembly 110 in the substantially same height with respect to the up-down direction. Incidentally, arrangement of the first and second developer collecting containers 10L and 10R side by side in the widthwise direction W includes that the first and second developer collecting containers 10L and 10R are disposed so as to at least partially overlap with each other with respect to the up-down direction.

4. Constitution of Developer Collecting Device

Next, with reference to FIGS. 4 and 5, a feeding passage of the collected developer by the developer collecting device 30 in this embodiment will be described. FIG. 5 is a schematic sectional view of the image forming apparatus 100 in this embodiment, and shows the feeding passage of the collected developer by omitting a part of elements from illustration.

In this embodiment, the developer collecting device 30 includes first to fifth discharging pipes 31*a* to 31*e*, a main discharging pipe 32, a vertical pipe 33 and a lateral pipe 34. In this embodiment, these first to fifth discharging pipes 31*a* to 31*e*, main discharging pipe 32, vertical pipe 33 and lateral pipe 34 are provided in the neighborhood of a rear end portion inside the apparatus main assembly 110.

The first to fifth discharging pipes 31*a* to 31*e* as discharging feeding portions are hollow pipe-like members extending in the up-down direction along substantially direction of gravitation. The first to fourth discharging pipes 31*a* to 31*d* receive the collected developers discharged from the drum cleaning devices 6 and the developing devices 4 of the stations SY, SM, SC and SK, respectively. Further, the fifth discharging pipe 31*e* receives the collected developer discharged from the belt cleaning device 9. Incidentally, in FIG. 2, the discharging feeding portions are illustrated in a simplified state, but the collected developers discharged from the drum cleaning device 6 and the developing device 4 merged with each other and are discharged and fed by a common discharging pipe.

The main discharging pipe 32 as a discharging feeding portion is a hollow pipe-like member extending in the left-right direction along the substantially horizontal direction. Particularly, in this embodiment, the main discharging pipe 32 is constituted by a circular pipe substantially elliptical in cross-section substantially perpendicular to an extension direction (axial direction) thereof. To upper side portions of the main discharging pipe 32, the first to fifth discharging pipes 31*a* to 31*e* are connected, respectively, and the inside of the main discharging pipe 32 and each of the insides of the first to fifth discharging pipes 31*a* to 31*e* communicate with each other so as to permit delivery of the collected developer. Inside (in the hollow portion of) the main discharging pipe 32, a discharging screw 35 as a discharging feeding member is provided. In this embodiment, the discharging screw 35 is constituted by an axial screw conveyor (spring auger) rotatable about a rotation shaft extending in the left-right direction along the extension direction (substantially horizontal direction) of the main discharging pipe 32. The discharging screw 35 feeds the collected developer inside the main discharging pipe 32 while stirring the collected developer. Further, a lower side portion of the main discharging pipe 32 positioned between opposite end portions of the main discharging pipe 32 with respect to the extension direction is provided with a main discharging opening 32*a*. This main discharging opening 32*a* is an opening through which the collected developer is dropped and discharged from the main discharging pipe 32 and then is delivered to the vertical pipe 33.

The collected developers sent to the first to fifth discharging pipes 31*a* to 31*e* are dropped inside (in the hollow portions of) the first to fifth discharging pipes 31*a* to 31*e* by the gravitation and are moved to the main discharging pipe 32. The collected developers dropped and merged with each other in the main discharging pipe 32 are fed to the main discharging opening 32*a* by the discharging screw 35. In this embodiment, the discharging screw 35 has a helical shape such that a left side-first portion and a right side-second portion with respect to the rotational axis direction thereof are different in helical direction with a position corresponding to the main discharging opening 32*a* as a boundary. The discharging screw 35 is rotationally driven in a predetermined direction by transmission of a rotational driving force from an unshown driving source (discharging screw driving portion) provided in the apparatus main assembly 110 through a drive transmission member (single or plurality of gears or the like). By this, the collected developers sent from the first to fifth discharging pipes 31*a* to 31*e* to the main discharging pipe 32 are fed in a direction from the left side to the right side by the first portion of the discharging screw 35. Further, the collected developers are fed in a direction from the right side to the left side by the second portion of the discharging screw 35. Thus, the collected developers inside the main discharging pipe 32 are sent together to the main discharging opening 32*a*. The collected developers fed to the main discharging opening 32*a* are dropped through the main discharging opening 32*a* and then are moved toward the vertical pipe 33.

The vertical pipe 33 as a vertical feeding portion is a hollow pipe-like member extending vertically substantially along the direction of gravitation. Incidentally, the vertical pipe 33 may also be inclined with respect to the direction of gravitation. Further, in this embodiment, inside the vertical pipe 33, the collected developer is dropped and moved by the gravitation, but a feeding member for feeding the collected developer may also be provided inside the vertical pipe 33. To an upper side portion of the vertical pipe 33, the main discharging pipe 32 is connected. Further, at an upper side end portion of the vertical pipe 33, a vertical pipe receiving opening 33*a* which is an opening through which the collected developer discharged through the main discharging opening 32*a* is received by the vertical pipe 33 is formed at a position corresponding to the main discharging opening 32*a* of the main discharging pipe 32. By this, the inside of the main discharging pipe 32 and the inside of the vertical pipe 33 communicate with each other through the main discharging opening 32*a* and the vertical pipe receiving opening 33*a*. Further, at a lower side end portion of the vertical pipe 33, a vertical pipe discharging opening 33*b* which is an opening through which the collected developer is dropped and discharged from the vertical pipe 33 by the gravitation and then is delivered to the lateral pipe 34 is formed.

The lateral pipe 34 as a lateral feeding portion is a hollow pipe-like member extending in the left-right direction along the substantially horizontal direction. Incidentally, the lateral pipe 34 may also be inclined with respect to the horizontal direction. Particularly, in this embodiment, the lateral pipe 34 is constituted by a circular pipe substantially circular in cross-section substantially perpendicular to the extension direction (axial direction) thereof. To an upper side portion of the lateral pipe 34 between opposite end portions of the lateral pipe 34 with respect to the extension direction, the vertical pipe 33 is connected. Further, at the upper side end portion of the lateral pipe 34, at a position corresponding to the vertical pipe discharging opening 33*b* of the vertical pipe 33, a lateral pipe receiving portion 34*a* which is an opening through which the collected developer discharged through the vertical pipe discharging opening 33*b* is received by the lateral pipe 34 is formed. By this, the inside of the vertical pipe 33 and the inside of the lateral pipe 34 communicate with each other through the vertical pipe discharging opening 33*b* and the lateral pipe receiving opening 34*a*. Further, at lower side end portions of the lateral pipe 34 positioned on opposite sides of the lateral pipe 34 with respect to the extension direction, first and second collecting discharging portions 34*b* and 34*c* are provided, respectively. These first and second collecting discharging portions 34*b* and 34*c* are disposed for delivering the collected developer to the first and second developer collecting containers 10L and 10R, respectively, by dropping and discharging the collected developer from the lateral pipe 34 by the gravitation. The first and second collecting discharging portions 34*b* and 34*c* are provided with openings (collecting discharging openings) at end portions thereof on the first developer collecting container 10L side and the second developer collecting container 10R side, respectively. The first collecting discharging portion 34*b* is provided in the neighborhood of a left side end portion (first end portion) of the lateral pipe 34, and the second collecting discharging portion 34*c* is provided in the neighborhood of a right side end portion (second end portion) of the lateral pipe 34. Here, the above-described lateral pipe receiving opening 34*a* is provided in the lateral pipe 34 so as to be positioned between the first and second collecting discharging portions 34*b* and 34*c* with respect to the horizontal direction in cross-section substantially perpendicular to the front-rear direction of the image forming apparatus 100.

Inside (in the hollow portion of) the lateral pipe 34, a feeding screw 36 as a feeding member is provided. In this embodiment, the feeding screw 36 is constituted by an axial screw conveyor (spring auger) rotatable about a rotation shaft extending in the left-right direction along the extension direction (substantially horizontal direction) of the lateral pipe 34. In this embodiment, the feeding screw 36 has a helical shape such that a direction of winding is one direction. The feeding screw 36 feeds the collected developer inside the lateral pipe 34 while stirring the collected developer. The feeding screw 36 is rotationally driven by transmission of a rotational driving force from a driving portion 37. In this embodiment, the driving portion 37 is constituted by including a driving motor as a driving source, and a driving train (single or plurality of gears or the like) for transmitting the driving force from the driving motor to the feeding screw 36. The driving motor of the driving portion 37 is rotatable in both of normal and reverse directions. By this, the driving portion 37 is capable of rotating the feeding screw 36 in a first direction and a second direction opposite to the first direction. As described above, the feeding screw 36 has the helical shape such that the direction of winding is one direction, and is rotated in the first direction, so that the feeding screw 36 feeds the collected developer inside the lateral pipe 34 from the right side-end portion (second end portion) side toward the left side-end portion (first end portion) side. Further, by rotation in the second direction, the feeding screw 36 feeds the collected developer inside the lateral pipe 34 from the left side-end portion (first end portion) side toward the right side-end portion (second end portion) side.

In this embodiment, the first and second developer collecting containers 10L and 10R are provided with container receiving openings 10*b*L and 10*b*R at upper side portions positioned at a rear side-end portion in a state in which the first and second developer collecting containers 10L and 10R are disposed at predetermined positions inside the apparatus main assembly 110. These container receiving openings 10*b*L and 10*b*R are used for receiving the collected developers discharged from the first and second collecting discharging portions 34*b* and 34*c* into the first and second developer collecting containers 10L and 10R, respectively. When the first and second developer collecting containers 10L and 10R are mounted at predetermined positions inside the apparatus main assembly 110, the container receiving openings 10*b*L and 10*b*R are disposed at positions corresponding to the first and second collecting discharging portions 34*b* and 34*c*, respectively. By this, the inside of the lateral pipe 34 and the inside of each of the first and second developer collecting containers 10L and 10R communicate with each other.

Further, in this embodiment, the apparatus main assembly 110 of the image forming apparatus 100 is provided with first and second container sensors 38L and 38R as container detecting means for detecting the presence or absence (mounting or dismounting state) of the first and second developer collecting containers 10L and 10R, respectively. In this embodiment, the first and second container sensors 38L and 38R are constituted by mechanical switches by which a signal outputted to a controller 50 (FIG. 6) described later changes depending on a state or urging or release of urging. The controller 50 is capable of controlling the driving portion 37 on the basis of detection results of the first and second container sensors 38L and 38R. The first container sensor 38L is urged by the first developer collecting container 10L when the first developer collecting container 10L is disposed at a predetermined position inside the apparatus main assembly 110, i.e., at a position where the first collecting discharging portion 34*c* and the first container receiving opening 10*b*L communicate with each other. By this, the controller 50 is capable of detecting that the first developer collecting container 10L is disposed at the predetermined position. Further, when the first developer collecting container 10L is moved (removed) from the predetermined position, the urging of the first container sensor 38L by the first developer collecting container 10L is released. By this, the controller 50 is capable of detecting that the first developer collecting container 10L was moved from the predetermined position. Similarly, by a signal of the second container sensor 38R, the controller 50 is capable of detecting that the second developer collecting container 10R was disposed at the predetermined position or that the second developer collecting container 10R was moved from the predetermined position. Incidentally, the container detecting means is not limited to the mechanical switch, but may also be constituted by an optical sensor, for example.

Further, in this embodiment, the apparatus main assembly 110 of the image forming apparatus 100 is provided with first and second full (state) sensors 39L and 39R as collected developer detecting means for detecting whether or not the first and second developer collecting containers 10L and 10R became full. In this embodiment, the first and second full sensors 39L and 39R are constituted by optical sensors for detecting a signal which is outputted to the controller 50 (FIG. 6) and which changes depending on a state of transmission or non-transmission of detection light. The controller 50 is capable of controlling the driving portion 37 on the basis of detection results of the first and second full sensors 39L and 39R. In this embodiment, each of the first and second full sensors 39L and 39R includes a light emitting (projecting) portion for emitting the detection light and a light receiving portion capable of receiving the detection light emitted from the light emitting portion. When the first and second developer collecting containers 10L and 10R are disposed at predetermined positions inside the apparatus main assembly 110, each of detection window portions (not shown) capable of permitting transmission of the detection light and provided on these containers is disposed between the emitting portion and the receiving portion. Inside the detection window portions, the collected developer enters when the collected developer in a predetermined (preset) amount corresponding to a full state is accommodated in the first and second developer collecting containers 10L and 10R. For that reason, in the case where the first and second developer collecting containers 10L and 10R become full with the collected developer, the detection light of each of the first and second full sensors 39L and 39R is blocked by the collected developer inside the detection window portion. By this, the controller 50 is capable of detecting that the first and second developer collecting containers 10L and 10R became full with the collected developer. Incidentally, the collected developer detecting means is not limited to the optical sensor, but may also be constituted by a weight sensor, for example.

5. Operation of Developer Collecting Device

Next, a feeding operation of the collected developer to the first and second developer collecting containers 10L and 10R by the developer collecting device 30 in this embodiment will be described. Here, an operation of the developer collecting device 30 when the collected developer is fed to each of the first and second developer collecting container 10L and 10R will be described. This operation is executed by controlling the driving portion 37 in accordance with a program stored in a memory 52 (FIG. 6) described later. Incidentally, a specific example of an operation sequence of the developer collecting device 30 including switching of a feeding destination of the collected developer will be described later.

<Feeding Operation to First Developer Collecting Container 10L>

In the developer collecting device 30, the collected developer sent from the image forming portion G to the vertical pipe 33 through the first to fifth discharging pipes 31*a* to 31*e* and the main discharging pipe 32 moves to the lateral pipe 34 through the vertical pipe 33. When the collected developer is fed to the first developer collecting container 10L, the driving motor of the driving portion 37 is normally rotated (normal rotation operation), so that the feeding screw 36 in the lateral pipe 34 is rotated in a first direction by transmission of a driving force from the driving portion 37 thereto. By this, the feeding screw 36 feeds the collected developer in the lateral pipe 34 in a direction from a right side toward a left side. By this, the collected developer fed in the lateral pipe 34 by the feeding screw 36 and sent to the first collecting discharging portion 34*b* is then sent to the first developer collecting container 10L. On the other hand, the collected developer sent from the vertical pipe 33 to the lateral pipe 34 is not fed in a direction from the left side toward the right side in the lateral pipe 34.

<Feeding Operation to Second Developer Collecting Container 10R>

In the developer collecting device 30, the collected developer sent from the image forming portion G to the vertical pipe 33 through the first to fifth discharging pipes 31*a* to 31*e* and the main discharging pipe 32 moves to the lateral pipe 34 through the vertical pipe 33. When the collected developer is fed to the second developer collecting container 10R, the driving motor of the driving portion 37 is reversely rotated (reverse rotation operation), so that the feeding screw 36 in the lateral pipe 34 is rotated in a second direction by transmission of a driving force from the driving portion 37 thereto. By this, the feeding screw 36 feeds the collected developer in the lateral pipe 34 in a direction from a left side toward a right side. By this, the collected developer fed in the lateral pipe 34 by the feeding screw 36 and sent to the second collecting discharging portion 34*c* is then sent to the second developer collecting container 10R. On the other hand, the collected developer sent from the vertical pipe 33 to the lateral pipe 34 is not fed in a direction from the right side toward the left side in the lateral pipe 34.

6. Control Mode

FIG. 6 is a schematic block diagram showing a control mode of a principal part of the image forming apparatus 100 in this embodiment. In this embodiment, the apparatus main assembly 110 of the image forming apparatus 100 is provided with the controller 50. The controller 50 is constituted by including a CPU 51 as a calculation (process) control means which is a central element for performing arithmetic processing, the memory (storing medium) 52, such as a RAM or a ROM, as a storing means, and an input/output circuit (not shown) through which signals are inputted and outputted between the controller 50 and each of the respective portions, and the like means. In the RAM which is a rewritable memory, information inputted to the controller 50, detected information, a calculation result and the like are stored, and in the ROM, a data table acquired in advance and the like are stored. Between the CPU 51 and the memory 52 such as the RAM or the ROM, transfer and reading of data can be carried out.

To the controller 50, the respective portions of the image forming portion G are connected. Further, to the controller 50, the driving portion 37, the first and second container sensors 38L and 38R, the first and second full sensors 39L and 39R, and the like of the developer collecting device 30 are connected. Further, to the controller 50, the operating portion (operating panel) 80 provided on the image forming apparatus 100 is connected. The operating portion 80 includes a display portion such as a liquid crystal panel as a display means for displaying information by control of the controller 50 and an inputting portion such as keys as an inputting means for inputting information to the controller 50 by an operation by an operator such as a user or a service person. The operating portion 80 may be constituted by including a touch panel having functions of the display portion and the inputting portion. Further, to the controller 50, an image reading apparatus (not shown) provided in the image forming apparatus 100 or connected to the image forming apparatus 100 and an external device such as a personal computer connected to the image forming apparatus 100 may be connected.

The controller 50 carries out integrated control of the respective portions of the image forming portion G on the basis of an instruction and information from the operating portion 80 of the image forming apparatus 100 and the external device, so that the controller 50 can cause the image forming portion G to execute the image forming operation. Further, the controller 50 carries out integrated control of the respective portions of the developer collecting device 30, so that the controller 50 can cause the respective portions to execute a feeding operation of the collected developer to the first and second developer collecting containers 10L and 10R and an operation prompting the operator to exchange the respective containers, and the like operation. The controller 50 can also be regarded as constitution a part of the developer collecting device 30.

7. Operation Sequence of Developer Collecting Device

Next, the specific example of the operation sequence of the developer collecting device 30 including the switching of the feeding destination of the collected developer in the developer collecting device 30 will be described. FIG. 7 is a flowchart showing an outline of the operation sequence. Here, for simplification, on the precondition that the first and second developer collecting containers 10L and 10R are disposed at predetermined positions inside the apparatus main assembly 110, an operation in which the feeding destination of the collected developer is switched during execution of a continuous image forming job will be described. Incidentally, the job is a series of operations for forming and outputting images on a single recording material P or a plurality of recording materials P by a single start instruction. Further, in the following, although description is omitted, the discharging screw 35 is rotationally driven continuously during the image formation, and when the image forming operation is ended (or interrupted), the drive of the discharging screw 35 is stopped.

When the job is inputted and the image forming operation is started (S101), on the basis of the information stored in the memory 52, the controller 50 discriminates whether or not the feeding destination of the collected developer is the first developer collecting container 10L (S102). Incidentally, every switching of the feeding destination of the collected developer, the controller 50 causes the memory 52 to store information on a current feeding destination of the collected developer. In the case where the controller 50 discriminated in S102 that the current feeding destination of the collected developer is not the first developer collecting container 10L ("NO"), the sequence goes to a process of S112. Further, in the case where the controller 50 discriminated in S102 that the current feeding destination of the collected developer is the first developer collecting container 10L ("YES"), the controller 50 causes the driving motor of the driving portion 37 to be normally rotated (normal rotation operation) (S103). Then, on the basis of a signal from the first full sensor 39L, the controller 50 discriminates whether or not the first developer collecting container 10L becomes full (whether or not the signal of the first full sensor 39L is "ON") (S104). In the case where the controller 50 discriminated in S104 that the first developer collecting container 10L does not become full ("NO"), the controller 50 causes the image forming portion G to continue the image forming operation (S105). Then, the controller 50 discriminates whether or not there is an image which has not yet outputted in the job (S106), and in the case where the controller 50 discriminated that the image which has not been yet outputted exists ("YES"), the sequence is returned to S104, and in the case where the controller 50 discriminated that there is no image which has not yet outputted ("NO"), the controller 50 causes the driving motor of the driving portion 37 to stop the drive thereof (S107). Then, the controller 50 ends the image forming operation and thus sends the job (S108). Further, in the case where the controller 50 discriminated in S104 that the first developer collecting container 10L becomes full ("YES"), on the basis of a signal from the second full sensor 39R, the controller 50 discriminates whether or not the second developer collecting container 10R becomes full (whether or not the signal of the second full sensor 39R is "ON") (S109). In the case where the controller 50 discriminated in S109 that the second developer collecting container 10R becomes full ("YES"), the controller 50 causes the driving motor of the driving portion 37 to stop (S110). Then, the controller 50 causes the image forming operation to interrupt (S111). In S111, the controller 50 is capable of causing the operating portion 80 (or a display portion or the like of the external device) to display a message for notifying the operator of a full state of both the first and second developer collecting containers 10L and 10R.

On the other hand, in the case where the controller 50 discriminated in S109 that the second developer collecting container 10R does not become full ("NO"), the controller 50 switches a rotational direction of the driving motor of the driving portion 37 and causes the driving motor to be reversely rotated (reverse rotation operation) (S112). By this, the feeding destination of the collected developer is switched from the first developer collecting container 10L to the second developer collecting container 10R. Incidentally, also in the case where the controller 50 discriminated in S102 that the current feeding destination of the collected developer is not the first developer collecting container 10L ("NO"), the controller 50 causes the driving motor of the driving portion 37 to be reversely rotated (reverse rotation operation) (S112). Then, on the basis of a signal from the second full sensor 39R, the controller 50 discriminates whether or not the second developer collecting container 10R becomes full (whether or not the signal of the second full sensor 39R is "ON") (S113). In the case where the controller 50 discriminated in S113 that the first developer collecting container 10L does not become full ("NO"), the controller 50 causes the image forming portion G to continue the image forming operation (S114). Then, the controller 50 discriminates whether or not there is an image which has not yet outputted in the job (S115), and in the case where the controller 50 discriminated that the image which has not been yet outputted exists ("YES"), the sequence is returned to S113, and in the case where the controller 50 discriminated that there is no image which has not yet outputted ("NO"), the controller 50 causes the driving motor of the driving portion 37 to stop the drive thereof (S116). Then, the controller 50 ends the image forming operation and thus sends the job (S117). Further, in the case where the controller 50 discriminated in S113 that the second developer collecting container 10R becomes full ("YES"), on the basis of a signal from the first full sensor 39L, the controller 50 discriminates whether or not the first developer collecting container 10L becomes full (whether or not the signal of the first full sensor 39L is "ON") (S118). In the case where the controller 50 discriminated in S118 that the first developer collecting container 10L does not become full ("NO"), the sequence goes to S103. That is, the controller 50 switches the rotational direction of the driving motor of the driving portion 37 and thus causes the driving motor to be normally rotated (normal rotation operation), so that the feeding destination of the collected developer is switched from the second developer collecting container 10R to the first developer collecting container 10L. Further, in the case where the controller 50 discriminated in S118 that the second developer collecting container 10R becomes full ("YES"), the controller 50 causes the driving motor of the driving portion 37 to stop (S119). Then, the controller 50 causes the image forming operation to interrupt (S120). In S120, the controller 50 is capable of causing the operating portion 80 (or a display portion or the like of the external device) to display a message for notifying the operator of a full state of both the first and second developer collecting containers 10L and 10R.

Further, in the case where the container which is the feeding destination of the collected developer is switched by switching the rotational direction of the driving motor of the driving portion 37 in S112 and S103, the controller 50 is capable of carrying out the following control. That is, the controller 50 can cause the operating portion 80 (or the display portion or the like of the external device) to display a message notifying (prompting) the operator of that there is a need to exchange the container which became full. At this time, the notification is not required to be made immediately during the image formation, but may also be made after the end of the job.

Incidentally, in this embodiment, although description was omitted for simplification, the controller 50 is capable of controlling the image forming operation and the operation of the developer collecting device 30 on the basis of the signals from the first and second container sensors 38L and 38R. For example, when the instruction to start the job is provided, in the case where the controller 50 discriminated that both the first and second developer collecting containers are not mounted, the controller 50 is capable of controlling the image forming portion G so as not to start the image forming operation. Further, for example, when a full state of either one of the first and second developer collecting containers 10L and 10R is detected, in the case where detection that the other container is not mounted is made, the controller 50 is capable of controlling the image forming portion G so as to interrupt the image forming operation. In either case, the controller 50 can cause the operating portion 80 (or the display portion or the like of the external device) to display a message prompting the operator to mount the corresponding container.

Thus, in this embodiment, in the case where one of the first and second developer collecting containers 10L and 10R became full, the feeding destination of the collected developer is switched to the other container, so that the first and second developer collecting containers 10L and 10R are used alternately. By this, even when one container becomes full during the image forming operation, the container can be exchanged without stopping the image forming operation. In this embodiment, on the basis of detection results of the first and second container sensors 38L and 38R and the first and second full sensors 39L and 39R, the controller 50 determines that the collected developer should be fed to either one of the first and second developer collecting containers 10L and 10R. Then, when the controller 50 discriminates that the associated container which is the feeding destination of the collected developer should be exchanged due to a full state of the associated container or the like reason, the controller 50 switches the container which is the feeding destination of the collected developer by reversing the rotational direction of the driving motor of the driving portion 37.

As described above, conventionally, in the constitution in which a plurality of developer collecting containers are provided so as to be mountable in and dismountable from the apparatus main assembly, the image forming apparatus is liable to be upsized. Further, the feeding passage of the collected developer from the image forming portion to each of the developer collecting containers becomes complicated, and therefore, a risk of sticking and clogging of the collected developer in the feeding passage increases.

On the other hand, in the image forming apparatus 100 in this embodiment, the first and second developer collecting containers 10L and 10R are disposed side by side at the above-described positions, and therefore, upsizing of the image forming apparatus can be suppressed. Further, the feeding passage of the collected developer can be shortened, so that it is possible to suppress the sticking and the clogging of the collected developer in the feeding passage. That is, according to this embodiment, in the constitution in which the plurality of developer collecting containers are provided so as to be mountable in and dismountable from the apparatus main assembly, it becomes possible to realize suppression of upsizing of the image forming apparatus and simplification of the feeding passage of the collected developer.

Embodiment 2

Then, another embodiment of the present invention will be described. In the image forming apparatus in this embodiment, elements having the same or corresponding functions and constitutions as those in the embodiment 1 are represented by the same reference numerals or symbols as those in the embodiment 1 and will be omitted from description.

FIG. 8 is a schematic sectional view (cross-section substantially perpendicular to a rotational axis direction of a photosensitive drum 1) of an image forming apparatus 100 in this embodiment according to the present invention. The image forming apparatus 100 in this embodiment is, similar to the image forming apparatus 100 in the embodiment 1, a tandem-type printer capable of forming a full-color image by employing an electrophotographic type and an intermediary transfer type.

Incidentally, as regards the image forming apparatus 100 and constituent elements thereof, a front side on the drawing sheet of FIG. 8 is referred to as a "front" side, and a rear side on the drawing sheet of FIG. 8 is referred to as a "rear" side. An operator such as a user or a service person performs, in general, an operation of the image forming apparatus 100 from the front side of the image forming apparatus 100. A front-rear direction of the image forming apparatus 100 is substantially parallel to a rotational axis direction of the photosensitive drum 1. Further, as regards the image forming apparatus 100 and the constituent elements thereof, a left side and a right side as viewed from the front side are referred to as a left side and a right side, respectively. Further, an up-down direction refers to an up-down direction with respect to the direction of gravitation, but does not mean only right above and right below, and also includes an upper side and a lower side of a horizontal plane passing through an associated element or position.

In the embodiment 1, the image forming apparatus 100 included the plurality (four in the embodiment 1) of stations SY, SM, SC and SK disposed side by side along the direction crossing the direction of gravitation, particularly in the embodiment 1, along the substantially horizontal direction. On the other hand, in this embodiment, the image forming apparatus 100 includes the plurality (four in this embodiment of stations SY, SM, SC and SK provided side by side along the direction crossing the horizontal direction, particularly in this embodiment, along the substantially direction of gravitation. Also, in this embodiment, similarly as in the image forming apparatus 100 in the embodiment 1, the image forming portion G includes the respective stations S, the intermediary transfer unit 70 and the fixing device 13.

Further, also in this embodiment, similarly as in the embodiment 1, first and second developer collecting containers 10L and 10R are provided as a plurality of developer collecting containers so as to be mountable in and dismountable from the apparatus main assembly 110 of the image forming apparatus 100. Further, the collected developer sent from the image forming portion G to the developer collecting device 30 is selectively fed and accumulated into either one of the first and second developer collecting containers 10L and 10R. Also, in this embodiment, the collected developer is, for example, discharged in the image forming portion G from the drum cleaning devices 6 and the developing devices 4 of the stations S and from the belt cleaning device 9. Further, in the case where the inside of either one of the first and second developer collecting containers 10L and 10R becomes full with the collected developer, a feeding destination of the collected developer is switched to the other container, and the container full with the collected developer is exchanged to a blank container. The first and second developer collecting containers 10L and 10R are mounted in the first and second container mounting portions 20L and 20R, respectively, as the container mounting portion 20 so as to be mountable and dismountable from the container mounting portions 20L and 20R, respectively.

Here, a direction substantially parallel to a rotational axis of, for example, the conveying roller pair 12*c* as a rotatable feeding member for feeding, toward the image forming portion G, the recording material P sent from the cassette 11 as a recording material accommodating portion is a depth direction D (see FIG. 3) of the image forming apparatus 100. The rotational axis of the conveying roller pair 12*c* is substantially parallel to a rotational axis of the photosensitive drum 1. That is, the depth direction D of the image forming apparatus 100 corresponds to the above-described front-rear direction of the image forming apparatus 100. Further, a direction substantially parallel to the horizontal direction in across-section substantially perpendicular to the rotational axis of the conveying roller pair 12*c* is a widthwise direction W (see FIG. 3) of the image forming apparatus 100. That is, the widthwise direction W of the image forming apparatus 100 corresponds to the above-described left-right direction of the image forming apparatus 100.

At this time, also in this embodiment, similarly as in the embodiment 1, the first and second container mounting portions 20L and 20R are capable of holding the first and second developer collecting containers 10L and 10R side by side in the widthwise direction W so that at a portion below the image forming portion G and above the cassette 11, not only half or more of a length of each of the first and second developer collecting containers 10L and 10R with respect to the depth direction D but also half or more of a length (width) of each of the first and second developer collecting containers 10L and 10R with respect to the widthwise direction W are disposed in a region sandwiched between the image forming portion G and the cassette 11. Particularly, in this embodiment, the first and second container mounting portions 20L and 20R is capable of holding the first and second developer collecting containers 10L and 10R side by side with respect to the widthwise direction W so that entirety of the length of each of the first and second developer collecting containers 10L and 10R with respect to the widthwise direction W is disposed in the region sandwiched between the image forming portion G and the cassette 11. Further, in this embodiment, the first and second container mounting portions 20L and 20R are constituted so that the first and second developer collecting containers 10L and 10R are moved along the depth direction D and thus are mountable in and dismountable from the first and second container mounting portions 20L and 20R, respectively.

In this embodiment, similarly as in the embodiment 1, the first and second developer collecting containers 10L and 10R are mounted by being moved from the front side to the rear side of the image forming apparatus 100, and are dismounted by being moved from the rear side to the front side of the image forming apparatus 100.

By this, also in this embodiment, similarly as in the embodiment 1, without upsizing the image forming apparatus 100 with respect to the depth direction D and the widthwise direction W, the first and second developer collecting containers 10L and 10R can be disposed side by side along the substantially horizontal direction inside the apparatus main assembly 110. In this embodiment, the first and second developer collecting containers 10L and 10R have the substantially same structure and are disposed side by side inside the apparatus main assembly 110 in the substantially same height with respect to the up-down direction.

Further, also in this embodiment, by the developer collecting device 30 similar to the developer collecting device 30 in the embodiment 1, the collected developer discharged from the image forming portion G to the first and second developer collecting containers 10L and 10R. As described above, in the image forming portion G, the collected developer may be discharged from the drum cleaning devices 6 and the developing devices 4 of the respective stations S and from the belt cleaning device 9.

As described above, in the image forming apparatus 100 in this embodiment, in the constitution in which the plurality of stations S are disposed along the direction (the substantially direction of gravitation in this embodiment) crossing the horizontal direction, the first and second developer collecting containers 10L and 10R are disposed side by side at the above-described positions. Also, by such a constitution, an effect similar to the effect of the embodiment 1 can be achieved. As also described above, the recording material P on which the toner images are fixed is discharged (outputted) by rollers 14 onto a tray 15 provided outside the apparatus main assembly 110 of the image forming apparatus 100.

Other Embodiments

The present invention was described based on the specific embodiments mentioned above, but is not limited to the above-mentioned embodiments.

In the above-described embodiments, the image forming apparatus was provided with the two developer collecting containers as the plurality of developer collecting containers so as to be mountable in and dismountable from the apparatus main assembly, but three or more (for example, three or four) developer collecting containers may also be provided. Also, in this case, by disposing these three or more developer collecting containers side by side at positions similar to those described in the above-described embodiments, an effect similar to those of the above-described embodiments can be achieved. Further, in the above-described embodiments, the feeding destination of the collected developer was changed every detection of the full state of one of the developer collecting containers. However, a use mode of the plurality of developer collecting containers is not limited to such a use made. For example, one of the developer collecting containers may also be used as a buffer container. That is, for example, a constitution in which in the case where the first developer collecting container becomes full, the feeding destination of the collected developer is temporarily switched to the second developer collecting container and then in the case where the first developer collecting container is exchanged to a blank container, the feeding destination of the collected developer is returned to the first developer collecting container may also be employed.

Further, in the above-described embodiments, the image forming apparatus was the tandem type color image forming apparatus employing the intermediary transfer type, but the present invention is not limited thereto. For example, the image forming apparatus may also be a tandem type color image forming apparatus employing a direct transfer type. This image forming apparatus includes, as is well known by the persons skilled in the art, a recording material carrying member (feeding belt or the like constituted by an endless belt) for carrying and feeding the recording material, in place of the intermediary transfer member in the above-described embodiments. Further, toner images formed on the image bearing members of the plurality of stations are successively transferred onto the recording material carried and fed by the recording material carrying member, and after the transfer, the recording material is discharged to the outside of the image forming apparatus. In this image forming apparatus, an image forming portion includes the respective stations, the recording material carrying member and the fixing device. Further, the image forming apparatus may also be a so-called one drum-type color image forming apparatus in which each of the toner images of a plurality of colors is successively transferred onto a single image bearing member and then is transferred onto the intermediary transfer member or the recording material carrying member. In this image forming apparatus, an image forming portion includes a toner image forming portion (corresponding to the station) for forming the toner images on the single image bearing member, the intermediary transfer member (or the recording material carrying member) and the fixing device. Further, the image forming apparatus may also be a monochromatic image forming apparatus. In this case, an image forming portion includes a toner image forming portion (corresponding to the station) for forming the toner image on a single image bearing member and the fixing device.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-073185 filed on Apr. 15, 2020, which is hereby incorporated by reference herein in its entirety.

What is claimed is:

1. An image forming apparatus comprising:

an image forming portion including an image bearing member for bearing a toner image and configured to form the toner image;

an intermediary transfer belt provided below the image bearing member and onto which the toner image is transferred from said image bearing member;

a first collecting container provided detachably and configured to collect residual toner discharged from said image forming portion;

a second collecting container provided detachably and configured to collect the residual toner discharged from said image forming portion;

a feeding device configured to feed the residual toner, discharged from said image forming portion, toward said first collecting container and said second collecting container selectively; and a cassette configured to accommodate a recording material, wherein said first collecting container and said second collecting container are provided below a bottom surface of said intermediary transfer belt and above said cassette and are disposed side by side in a widthwise direction perpendicular to a rotational axis direction of said image bearing member, and wherein at least a part of said first collecting container overlaps with said intermediary transfer belt and said cassette as viewed in the vertical direction, and at least a part of said second collecting container overlaps with said intermediary transfer belt and said cassette as viewed in the vertical direction.

2. An image forming apparatus according to claim 1, wherein as viewed in the vertical direction, a region where said first collecting container and said intermediary transfer belt overlap with each other is a half or more of a length of said first collecting container with respect to an axial direction of said image bearing member and is a half or more of a width of said first collecting container with respect to a widthwise direction crossing the axial direction of said image bearing member, and a region where said second collecting container and said intermediary transfer belt overlap with each other is a half or more of a length of said second collecting container with respect to the axial direction of said image bearing member and is a half or more of a width of said second collecting container with respect to the widthwise direction.

3. An image forming apparatus according to claim 1, further comprising a controller configured to control said feeding device, wherein in a case that said first collecting container becomes full when said feeding device feeds the residual toner to said first collecting container during image formation, said controller is constituted so as to be capable of controlling said feeding device so that a feeding destination of the residual toner is switched from said first collecting container to said second collecting container and is constituted so as to be capable of controlling said image forming portion so that an image forming operation is continued.

4. An image forming apparatus according to claim 3, further comprising:

a first sensor configured to detect the residual toner in said first collecting container; and a second sensor configured to detect the residual toner in said second collecting container, wherein said controller is constituted so as to be capable of switching the feeding destination of the residual toner from said first collecting container to said second collecting container on the basis of a detection result of said first sensor and a detection result of said second sensor.

5. An image forming apparatus according to claim 1, wherein as viewed in the vertical direction, each of said first collecting container and said second collecting container is disposed inside each of opposite ends of a region, with respect to the widthwise direction, where said intermediary transfer belt is disposed.

6. An image forming apparatus according to claim 1, wherein said feeding device comprises:

a vertical feeding passage along which the residual toner discharged from said image forming portion is fed in the vertical direction;

a lateral feeding passage capable of feeding the residual toner, delivered from said vertical feeding passage, in a direction crossing the vertical direction, wherein said lateral feeding passage includes a first discharge opening which is provided on one end side of said lateral feeding passage with respect to an extension direction of said lateral feeding passage and along which the residual toner is discharged toward said first collecting container, a second discharge opening which is provided on another side of said lateral feeding passage with respect to the extension direction and along which the residual toner is discharged toward said second collecting container, and a receiving opening which is provided between said first discharge opening and said second discharge opening with respect to the extension direction and through which the residual toner is received from said vertical feeding passage;

a helical feeding member rotatable about a rotational axis along said lateral feeding passage and constituted so as to feed the residual toner, received through said receiving opening, toward said first discharge opening by rotation thereof in a first direction and so as to feed the residual toner, received through said receiving opening, toward said second discharge opening by rotation thereof in a second direction opposite to the first direction; and a driving portion configured to rotationally drive said helical feeding member in the first direction and the second direction.

7. An image forming apparatus according to claim 1, wherein said first collecting container and said second collecting container are mountable in and dismountable from a first mounting portion and a second mounting portion, respectively, with respect to the rotational axis direction of said image bearing member.

8. An image forming apparatus according to claim 1, wherein each of said first collecting container and said second collecting container is mountable in each of a first mounting portion and a second mounting portion.

9. An image forming apparatus according to claim 1, further comprising:

a panel provided in front of said cassette; and a door openable when said first collecting container and said second collecting container are exchanged, wherein said door is constituted so as to have substantially the same size as said panel with respect to an up down direction and the widthwise direction.

10. An image forming apparatus according to claim 1, wherein each of said first collecting container and said second collecting container is a box like container which has a substantially rectangular cross section perpendicular to the axial direction of said image bearing member, and a length of each of said first collecting container and said second collecting container in the widthwise direction is longer than the length in a height direction.

11. An image forming apparatus according to claim 6, wherein said image forming portion is a first image portion, and further comprising a second image forming portion including an image bearing member for bearing a toner image and configured to form the toner image;

wherein said feeding device comprises:

an aggregate feeding passage configured to aggregate the residual toner discharged from said first image forming portion and the residual toner discharged from said second image forming portion and capable of feeding the residual toner in an aggregate feeding direction traversing an up-down direction, said aggregate feeding passage having a first receiving opening and a second receiving opening through which the residual toner discharged from said first image forming portion and the residual toner discharged from said second image forming portion are received, respectively, and an aggregate discharging opening configured to discharge the residual toner aggregated in said aggregate feeding passage and being provided between said first receiving opening and said second receiving opening with respect to the aggregate feeding direction, and an aggregate screw member provided in said aggregate feeding passage including a first helical portion and a second helical portion, wherein the first helical portion feeds the residual toner received from the first image portion toward the aggregate discharging opening by rotating said aggregate screw member in a predetermined direction and the second helical portion feeds the residual toner received from the second image portion toward the aggregate discharging opening by rotating said aggregate screw member in the predetermined direction.

12. An image forming apparatus comprising:

an image forming portion including an image bearing member for bearing a toner image and configured to form the toner image;

an intermediary transfer belt onto which the toner image is transferred from said image bearing member;

wherein said intermediary transfer belt and said image bearing member are disposed side by side in a widthwise direction perpendicular to a rotational axis direction of said image bearing member;

a first collecting container provided detachably and configured to collect residual toner discharged from said image forming portion;

a second collecting container provided detachably and configured to collect the residual toner discharged from said image forming portion; and a feeding device configured to feed the residual toner, discharged from said image forming portion, toward said first collecting container and said second collecting container selectively, wherein said first collecting container and said second collecting container are provided below said intermediary transfer belt and are disposed side by side in the widthwise direction, and wherein at least a part of said first collecting container overlaps with said intermediary transfer belt or said image forming portion as viewed in a vertical direction, and at least a part of said second collecting container overlaps with said intermediary transfer belt or said image forming portion as viewed in the vertical direction.

13. An image forming apparatus according to claim 12, further comprising a controller configured to control said feeding device, wherein in a case that said first collecting container becomes full when said feeding device feeds the residual toner to said first collecting container during image formation, said controller is constituted so as to be capable of controlling said feeding device so that a feeding destination of the residual toner is switched from said first collecting container to said second collecting container and is constituted so as to be capable of controlling said image forming portion so that an image forming operation is continued.

14. An image forming apparatus according to claim 12, with said image forming portion including;

a charging device configured to electrically charge said image bearing member;

a latent image forming device configured to form a latent image on said image bearing member charged;

a developing device configured to develop the latent image, formed on said image bearing member, into a toner image; and a cleaning device configured to clean said image bearing member.

15. An image forming apparatus according to claim 12, wherein said feeding device comprises:

a vertical feeding passage along which the residual toner discharged from said image forming portion is fed in the vertical direction;

a lateral feeding passage capable of feeding the residual toner, delivered from said vertical feeding passage, in a direction crossing the vertical direction, wherein said lateral feeding passage includes a first discharge opening which is provided on one end side of said lateral feeding passage with respect to an extension direction of said lateral feeding passage and along which the residual toner is discharged toward said first collecting container, a second discharge opening which is provided on another side of said lateral feeding passage with respect to the extension direction and along which the residual toner is discharged toward said second collecting container, and a receiving opening which is provided between said first discharge opening and said second discharge opening with respect to the extension direction and through which the residual toner is received from said vertical feeding passage;

a helical feeding member rotatable about a rotational axis along said lateral feeding passage and constituted so as to feed the residual toner, received through said receiving opening, toward said first discharge opening by rotation thereof in a first direction and so as to feed the toner, received through said receiving opening, toward said second discharge opening by rotation thereof in a second direction opposite to the first direction; and a driving portion configured to rotationally drive said helical feeding member in the first direction and the second direction.

16. An image forming apparatus according to claim 12, wherein said first collecting container and said second collecting container are mountable in and dismountable from a first mounting portion and a second mounting portion, respectively, with respect to the rotational axis direction of said image bearing member.

17. An image forming apparatus according to claim 12, wherein as viewed in the vertical direction, a region where said first collecting container overlaps with said intermediary transfer belt or said image forming portion is a half or more of a length of said first collecting container with respect to an axial direction of said image bearing member and is a half or more of a width of said first collecting container with respect to the widthwise direction crossing the axial direction of said image bearing member, and a region where said second collecting container overlaps with said intermediary transfer belt or said image forming portion is a half or more of a length of said second collecting container with respect to the axial direction of said image bearing member and is a half or more of a width of said second collecting container with respect to the widthwise direction.

18. An image forming apparatus according to claim 12, wherein each of said first collecting container and said second collecting container is a box like container which has a substantially rectangular cross section perpendicular to the axial direction of said image bearing member, and a length of each of said first collecting container and said second collecting container in the widthwise direction is longer than the length in a height direction.

* * * * *